(12) United States Patent
Darbari

(10) Patent No.: US 11,989,299 B2
(45) Date of Patent: *May 21, 2024

(54) VERIFYING FIRMWARE BINARY IMAGES USING A HARDWARE DESIGN AND FORMAL ASSERTIONS

(71) Applicant: Imagination Technologies Limited, Kings Langley (GB)

(72) Inventor: Ashish Darbari, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 312 days.

This patent is subject to a terminal disclaimer.

(21) Appl. No.: 17/158,798

(22) Filed: Jan. 26, 2021

(65) Prior Publication Data

US 2021/0150031 A1 May 20, 2021

Related U.S. Application Data

(63) Continuation of application No. 15/784,615, filed on Oct. 16, 2017, now Pat. No. 11,010,477.

(30) Foreign Application Priority Data

Oct. 14, 2016 (GB) .................................... 1617532

(51) Int. Cl.
*G06F 21/57* (2013.01)
*G06F 21/51* (2013.01)

(52) U.S. Cl.
CPC ............ *G06F 21/572* (2013.01); *G06F 21/51* (2013.01); *G06F 2221/033* (2013.01)

(58) Field of Classification Search
CPC .. G06F 21/572; G06F 21/51; G06F 2221/033; G06F 11/3608; G06F 30/3323
See application file for complete search history.

(56) References Cited

U.S. PATENT DOCUMENTS 9,317,636 B1 * 4/2016 Petras .................... G06F 30/33
2003/0097613 A1 5/2003 Kageshima
(Continued)

OTHER PUBLICATIONS

Herber, "The RESCUE Approach—Towards Compositional Hardware/Software Co-Verification," 2014 IEEE International Conference on High Performance Computing and Communications, Dec. 2014, pp. 721-724.
(Continued)

*Primary Examiner* — Harunur Rashid
(74) *Attorney, Agent, or Firm* — Potomac Law Group, PLLC; Vincent M DeLuca

(57) ABSTRACT

Described herein are hardware monitors arranged to detect illegal firmware instructions in a firmware binary image using a hardware design and one or more formal assertions. The hardware monitors include monitor and detection logic configured to detect when an instantiation of the hardware design has started and/or stopped execution of the firmware and to detect when the instantiation of the hardware design has decoded an illegal firmware instruction. The hardware monitors also include assertion evaluation logic configured to determine whether the firmware binary image comprises an illegal firmware instruction by evaluating one or more assertions that assert that if a stop of firmware execution has been detected, that a decode of an illegal firmware instruction has (or has not) been detected. The hardware monitor may be used by a formal verification tool to exhaustively verify that the firmware boot image does not comprise an illegal firmware instruction, or during simulation to detect illegal firmware instructions in a firmware boot image.

14 Claims, 8 Drawing Sheets

(56) References Cited

U.S. PATENT DOCUMENTS

| | | | |
|---|---|---|---|
| 2004/0030960 A1 | 2/2004 | Ito | |
| 2011/0029961 A1* | 2/2011 | Muth | G06F 21/53 |
| | | | 717/154 |
| 2011/0213986 A1* | 9/2011 | Kanee | G06F 21/572 |
| | | | 713/187 |
| 2016/0171213 A1* | 6/2016 | Furukawa | G06F 21/52 |
| | | | 726/23 |

OTHER PUBLICATIONS

Xie et al., "Component-based hardware/software co-verification for building trustworthy embedded systems," The Journal of Systems and Software, Sep. 2006, vol. 80, pp. 643-654.
Wang et al., "Malicious Firmware Detection with Hardware Performance Counters," IEEE Transactions on Multi-Scale Computing Systems, vol. 2, No. 3, Jul.-Sep. 2016, pp. 160-173.
(*Note: NPL documents in parent application).

* cited by examiner

VERIFYING FIRMWARE BINARY IMAGES USING A HARDWARE DESIGN AND FORMAL ASSERTIONS

CROSS-REFERENCE TO RELATED APPLICATIONS AND CLAIM OF PRIORITY

This application is a continuation under 35 U.S.C. 120 of copending application Ser. No. 15/784,615 filed Oct. 16, 2017, which claims foreign priority under 35 U.S.C. 119 from United Kingdom Application No. 1617532.5 filed Oct. 14, 2016.

BACKGROUND

As is known to a person of skill in the art, firmware is a set of executable instructions that is stored in non-volatile memory (e.g. read-only-memory (ROM), programmable ROM (PROM), erasable programmable ROM (EPROM), and flash-ROM) of an electronic device so the firmware remains in the memory of the device even without power. Firmware may comprise instructions for configuring, and controlling the operation of, hardware components of an electronic device. Some firmware may only include instructions that comprise boot data that initializes one or more hardware components. For example, the basic-input-output system (BIOS) firmware for a computer motherboard comprises instructions that, on powering up, initialize the hardware. However, other firmware may also comprise an operating system or control program.

Firmware is at the heart of every electronic device including routers, portable audio players, mobile phones, digital cameras, all the way down to keyboards and mice.

Since the firmware controls the hardware components of an electronic device errors or bugs in the firmware can be catastrophic.

The embodiments described below are provided by way of example only and are not limiting of implementations which solve any or all of the disadvantages of known methods and systems for identifying errors or bugs in firmware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are hardware monitors arranged to detect illegal firmware instructions in a firmware binary image using a hardware design for hardware to run the firmware and one or more formal assertions. The hardware monitors include monitor and detection logic configured to detect when an instantiation of the hardware design has started and/or stopped executing the firmware and to detect when the instantiation of the hardware design has decoded an illegal firmware instruction. The hardware monitors also include assertion evaluation logic configured to determine whether the firmware binary image comprises an illegal firmware instruction by evaluating one or more assertions that assert that if firmware execution has stopped that a decode of an illegal firmware instruction has (or has not) been detected. The hardware monitor may be used by a formal verification tool to exhaustively verify that the firmware boot image does not comprise an illegal firmware instruction, or during simulation to detect illegal firmware instructions in a firmware boot image.

A first aspect provides a hardware monitor arranged to detect illegal firmware instructions in a firmware binary image based on a hardware design (for an electronic device configured to execute the firmware binary image, detect illegal firmware instructions in the firmware binary image, and stop execution of the firmware binary image upon detection of an illegal firmware instruction, the hardware monitor comprising: monitor and detection logic configured to: detect that an instantiation of the hardware design has stopped execution of the firmware; and detect that the instantiation of the hardware design implements a decode of an illegal firmware instruction; and assertion evaluation logic configured to determine whether the firmware binary image comprises an illegal firmware instruction by evaluating one or more assertions that assert a formal property that states that if a stop of firmware execution has been detected, that decode of an illegal firmware instruction has, or has not, been detected.

A second aspect provides a method of detecting illegal firmware instructions in a firmware binary image, the method comprising: receiving the firmware binary image; receiving a hardware design for an electronic device configured to execute the firmware binary image, detect illegal firmware instructions in the firmware binary image, and stop execution of the firmware binary image upon detection of an illegal firmware instruction; loading the firmware binary image into the hardware design; receiving a hardware monitor according to the first aspect; binding the hardware monitor to the hardware design loaded with the firmware binary image; formally verifying, using a formal verification tool, the one or more formal assertions are true for the hardware design loaded with the firmware; and outputting one or more signals indicating whether or not each of the one or more formal assertions was successfully verified to identify whether the firmware binary image comprises an illegal firmware instruction.

A third aspect provides a system configured to detect illegal instructions in a firmware binary image, the system comprising: a memory configured to store: the firmware binary image; a hardware design for an electronic device configured to execute the firmware binary image, detect illegal firmware instructions in the firmware binary image, and stop execution of the firmware binary image upon detection of an illegal firmware instruction; a formal verification tool; and the hardware monitor of the first aspect; one or more processors configured to: formally verify, using the formal verification tool, that the one or more formal assertions are true for the hardware design loaded with the firmware binary image; and output one or more signals indicating whether or not each of the one or more formal assertions was successfully verified to identify whether the firmware binary image comprises an illegal firmware instruction.

The electronic device may be embodied in hardware on an integrated circuit. There may be provided a method of manufacturing, at an integrated circuit manufacturing system, an electronic device. There may be provided an integrated circuit definition dataset that, when processed in an integrated circuit manufacturing system, configures the system to manufacture an electronic device. There may be provided a non-transitory computer readable storage medium having stored thereon a computer readable description of an integrated circuit that, when processed, causes a layout processing system to generate a circuit layout description used in an integrated circuit manufacturing system to manufacture an electronic device.

There may be provided an integrated circuit manufacturing system comprising: a non-transitory computer readable storage medium having stored thereon a computer readable integrated circuit description (e.g. hardware design) that describes the electronic device; a layout processing system configured to process the integrated circuit description so as to generate a circuit layout description of an integrated circuit embodying the electronic device; and an integrated circuit generation system configured to manufacture the electronic device according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
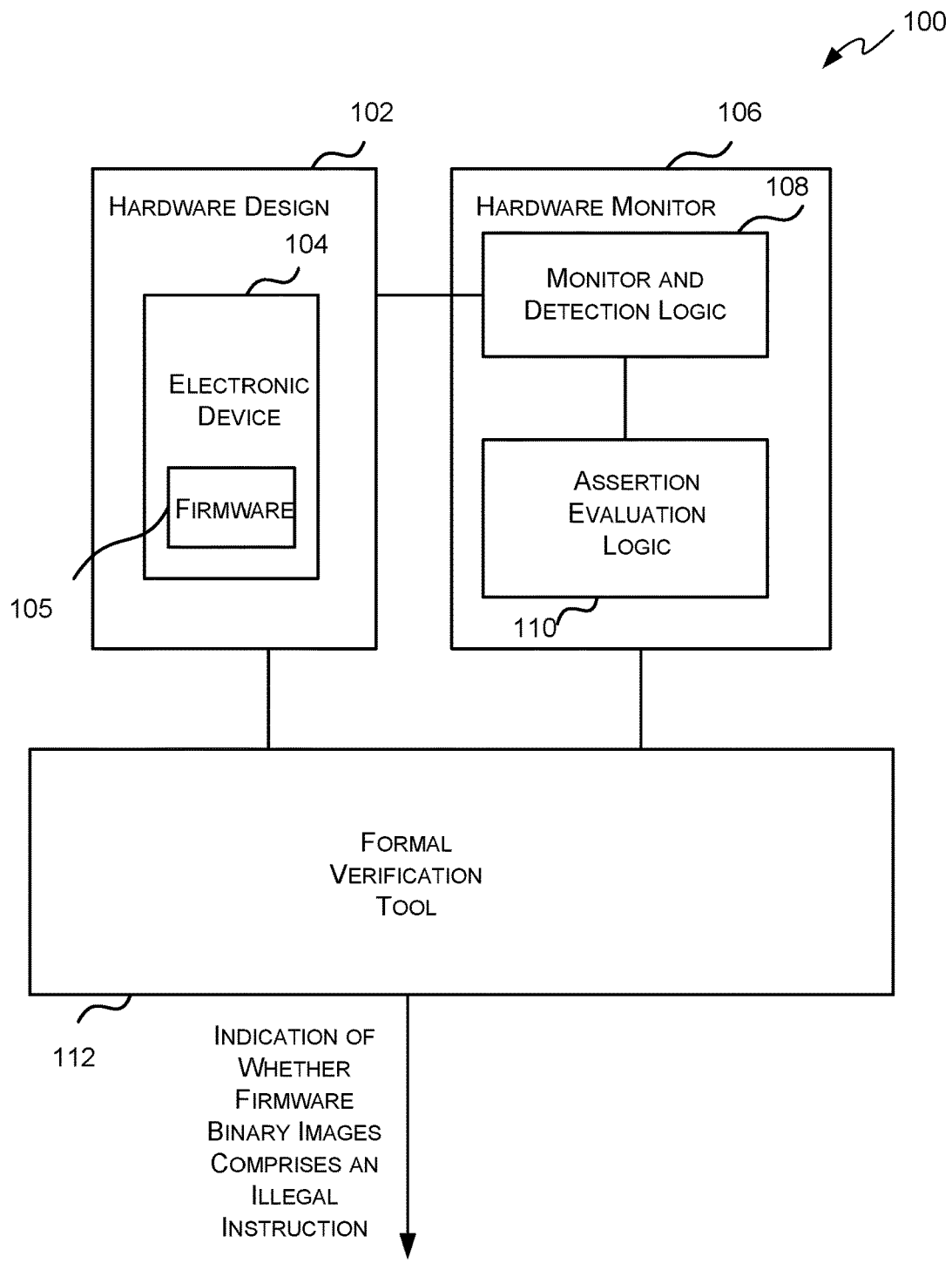
FIG. 1 is a block diagram of an example system for detecting errors or bugs in a firmware binary image using a hardware design of an electronic device to execute the firmware binary image, and one or more formal assertions.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, since firmware controls the hardware components of an electronic device, errors or bugs in the firmware can be catastrophic. For example, an illegal firmware instruction in the firmware may cause the electronic device to behave unpredictably and may even cause the electronic device to crash or become inoperable. The term "illegal firmware instruction" is used herein to mean an instruction that is a valid instruction in the instruction set used to generate the firmware, but is an instruction that is not permitted to be in the firmware. An illegal instruction may not be permitted in a particular firmware because for example it may cause an error if executed or because it cannot be executed properly due to the constraints under which the firmware is executed.

For example, illegal firmware instructions for boot firmware, which is executed upon power up of an electronic device, may include function pointer instructions (e.g. call function pointer instruction, set function pointer instruction, set function pointer index instruction, and a jump function pointer instruction) since the function pointers will not have been set-up at the time the boot firmware is executed. Other illegal firmware instructions may not be specific to firmware or a particular type of firmware, but may be instructions that are known to cause errors in any program. For example, a return instruction without a preceding call instruction may be designated as an illegal firmware instruction, and/or a jump instruction that jumps to an out-of-bounds memory address may be designated as an illegal firmware instruction. It will be evident to a person of skill in the art that these are examples only and the methods and techniques described herein can be used to detect any type of illegal firmware instruction in a firmware binary image.

It is generally easy to detect from the human-readable code (e.g. source code) for the firmware whether the firmware contains an illegal firmware instruction. For example, it is easy to visually determine that the following example firmware source code comprises an illegal firmware instruction—a CALL_FP instruction:

```
LOAD_IM S0 0x11111110
LOAD_IM S1 0x11111111
LOAD_IM S2 0x11111111
LOAD_IM S3 0x33333333
LOAD_IM S4 0x44444444
LOAD_IM S5 0x55555555
LOAD_IM S6 0x66666666
LOAD_IM S7 0x77777777
CALL FP 0
COMPARE S0 S1
IFTRUE LOAD_IM S0 0xFFFFFFFF
IFFALSE COMPARE S1 S2
IFTRUE LOAD_IM S2 0x22222222
```

However, before firmware is loaded into non-volatile memory of the electronic device it is converted (e.g. via an assembler) into a binary image (which is referred to herein as a firmware binary image). The firmware binary image (such as that shown below) is simply a string of ones and zeros that represent the firmware instructions. It is generally difficult and tedious, using known techniques (such as reverse engineering) to identify the specific instructions in a firmware binary image from the firmware binary image itself. Furthermore, even if a known technique is able to produce an estimate of the specific instructions in a firmware binary image the estimate is typically unreliable and fraught with errors.

```
000100010001000000000000011001011
000000011100101100010001000100010001
0001000100010001000100010001
000100010001000100000101101011
00000011110010110001000100010001
001100110011001100110011001100110011
010001000100010000000010011001011
000000101110010110100010001000100
0101010101010101010101010101010101
011001100110011000000011011001011
000000111100101101100110011001100110
0111011101110111011101110111101110111
....
```

As a result, it is difficult to determine if a firmware binary image comprises an illegal firmware instruction which was caused, for example, by an error in the assembler.

Accordingly, the embodiments described herein relate to methods, systems and hardware monitors for detecting illegal firmware instructions in a firmware binary image using a hardware design for the electronic device configured to run the firmware binary image, and one or more formal assertions. Specifically, the methods, systems and hardware monitors described herein use the states of the hardware design to determine whether or not the firmware binary image comprises an illegal firmware instruction. In particular, where an instantiation of the hardware design (e.g. hardware according to the hardware design) will stop executing the firmware (i) when it has executed all of the instructions in the firmware, or (ii) when it detects an illegal firmware instruction in the firmware, then it is possible to identify the reason for stopping execution of the firmware and to identify whether there is an illegal firmware instruction in the firmware binary image.

The methods include generating a hardware monitor that is configured to detect when an instantiation of the hardware design (i) starts and/or stops executing the firmware; and (ii) decodes an illegal firmware instruction while executing the firmware. The hardware monitor is also configured to evaluate one or more formal assertions that assert a formal property that states that if execution of the firmware has stopped that a decode of an illegal firmware instruction was (or was not) detected. In other words the one or more formal assertions determine if firmware execution stopped because an illegal firmware instruction was detected.

The firmware binary image is then loaded into the hardware design, and the hardware design (with the firmware binary image loaded therein) and the hardware monitor are provided to a formal verification tool. The formal verification tool then formally verifies the one or more formal assertions for all valid sequence of states of the instantiation of the hardware design (loaded with the firmware binary image) to exhaustively verify that the firmware binary image does not comprise an illegal firmware instruction.

In formal verification, the hardware design is transformed into a mathematical model (e.g. a state-transition system) to thereby provide an instantiation of the hardware design which can be tested to verify the hardware design, and the properties to be verified are expressed using mathematical logic using a precise syntax or a language with a precise mathematical syntax and semantics. A property is then verified by searching the entire reachable state space of the hardware design without explicitly traversing the state machine. Since formal verification algorithmically and exhaustively explores all input values over time, verifying properties in this manner allows a property to be exhaustively proved or disproved for all valid states. In the embodiments described herein the formal verification of the assertion(s) allows exhaustive verification that firmware binary image does not comprise an illegal firmware instruction.

Using the methods, systems and hardware monitors described herein to verify that a firmware binary image does not comprise an illegal firmware instruction allows the firmware binary image to be tested in a quick and efficient manner. Testing has shown that in some cases, the methods, systems, and hardware monitors described herein have been able to verify a firmware binary image in less than 20 seconds of wall clock time testing. The methods, systems and hardware monitors described herein also allow unusual bugs or errors in the firmware binary image (e.g. corner cases) to be identified that would be difficult, if not, impossible to identify through simulation-based verification. Furthermore, by testing the firmware binary image in conjunction with the hardware design the testing is more akin to a real-life scenario as it takes into account the interaction between the firmware and the hardware.

Reference is now made to FIG. 1 which illustrates an example system 100 for detecting illegal instructions in a firmware binary image using a hardware design for the electronic device to run the firmware and one or more formal assertions. The system 100 may be implemented on a general-purpose computing-based device such as that described below with respect to FIG. 7.

The system 100 comprises a hardware design 102 that describes an electronic device 104; a firmware binary image 105 that has been loaded into the hardware design 102; a hardware monitor 106 configured to detect when an instantiation of the hardware design starts and/or stops executing the firmware; detect when the instantiation of the hardware design decodes an illegal firmware instruction while executing the firmware; and evaluate one or more formal assertions that assert a formal property that states that if the instantiation of the hardware design has stopped executing the firmware that a decode of an illegal firmware instruction was (or was not) detected. The system 100 also includes a formal verification tool 112 configured to use the hardware monitor 106 to exhaustively verify via the hardware design 102 that the firmware binary image 105 does not comprise an illegal firmware instruction.

The term "hardware design" is used herein to refer to a description of the structure and function of an integrated circuit which when processed at an integrated circuit manufacturing system causes the integrated circuit manufacturing system to generate an integrated circuit described by the hardware design. For example, as described in more detail below with respect to FIG. 8, when a hardware design is processed at an integrated circuit manufacturing system the integrated circuit manufacturing system may generate the integrated circuit by synthesizing the hardware design into silicon, or, by loading configuration data into an a field-programmable gate array (FPGA).

The hardware design 102 may be implemented in a high level hardware description language (HDL), such as, but not limited to, a register transfer level (RTL) language. Examples of register transfer level languages include, but are not limited to, VHDL (VHS IC Hardware Description Language) and Verilog. It will be evident to a person of skill in the art that other high level hardware description languages may be used such as proprietary high level hardware description languages.

The term "instantiation of a hardware design" is used herein to refer to a representation of the hardware defined by the hardware design. An instantiation of a hardware design may include, but is not limited to, a synthesized version of the hardware design, hardware (e.g. integrated circuit) made to the hardware design, and a mathematical model (e.g. a state-transition system) of the hardware design generated by a formal verification tool. An instantiation of the hardware design embodies the hardware design in a form which can be tested to verify the hardware design.

The hardware design 102 of FIG. 1 describes the structure and functionality of an integrated circuit that forms an electronic device 104. An electronic device 104 is any kind of device, machine, or dedicated circuit, or collection or portion therefore comprising one or more processors that can execute computer-readable instructions stored in memory.

A processor may be any kind of general purpose or dedicated processor, such as a CPU, GPU, system-on-chip (SoC), state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'electronic device' includes set top boxes, media players, digital radios, PCs, servers, mobile telephones, personal digital assistants and many other devices.

As is known to those of a skill in the art, a processor fetches instructions from a program, decodes the fetched instructions, executes the decoded instructions, and stores/commits the results of the executed instructions in memory and/or registers. The processor may be any processor capable of executing instructions. For example, the processor may be a pipelined or un-pipelined processor, a single-threaded or multi-threaded processor, an in-order or out-of-order processor or any combination thereof.

The memory of the electronic device 104 includes at least one non-volatile memory module (e.g. read-only-memory (ROM), programmable ROM (PROM), erasable programmable ROM (EPROM), and flash-ROM)) for storing the firmware binary image. The electronic device 104 may also include other memory modules suitable for storing computer readable instructions such as RAM.

The hardware design 102 of FIG. 1 is configured so that an instantiation of the hardware design 102 will execute firmware (in the form of a firmware binary image 105) stored in non-volatile memory thereof, detect when the firmware binary image 105 comprises an illegal firmware instruction, and, in response to detecting the firmware comprises an illegal firmware instruction stop executing the firmware. For example, the hardware design 102 may be configured so that an instantiation of the hardware design 102 will execute a boot sequence stored in BOOT ROM, detect if the boot sequence includes an illegal firmware instruction, and, in response to detecting that the boot sequence includes an illegal firmware instruction, transition to an IDLE state.

The hardware monitor 106 is a module configured to monitor and analyze states and/or signals of the hardware design 102 onto which the firmware binary image 105 has been loaded to determine whether the firmware binary image comprises an illegal firmware instruction. In particular, the hardware monitor 106 is configured to detect when an instantiation of the hardware design 102 starts and/or stops executing the firmware; detect when the instantiation of the hardware design 102 implements a decode of an illegal firmware instruction while executing the firmware; and evaluate one or more formal assertions that assert a formal property that states that if the instantiation of the hardware design has stopped executing the firmware that a decode of an illegal instruction was (or was not) detected to determine if the firmware binary image comprises an illegal firmware instruction. The particular instructions that are considered illegal firmware instruction(s) for the firmware binary image under test may be defined in the specification for the firmware and/or the specification for the hardware design 102.

In the example of FIG. 1, the hardware monitor 106 comprises monitor and detection logic 108 and assertion evaluation logic 110. The monitor and detection logic 108 is configured to monitor one or more control signals and/or data signals of the hardware design 102 to (i) detect when an instantiation of the hardware design 102 has started and/or stopped execution of the firmware; and (ii) detect when the instantiation of the hardware design 102 has decoded an illegal firmware instruction while executing the firmware. The specific control signals and/or data signals that are monitored and the configuration thereof that (i) indicate the instantiation of the hardware design has started or stopped executing the firmware; and/or (ii) indicate that the instantiation of the hardware design 102 has decoded an illegal firmware instruction while executing the firmware, depends on the configuration of the hardware design 102. Example implementations of the monitor and detection logic 108 will be described with reference to FIGS. 3 and 5.

The assertion evaluation logic 110 is configured to evaluate one or more formal assertions that assert a formal property that states if the instantiation of the hardware design 102 has stopped execution of the firmware that the stopping was (or was not) preceded by a decode of an illegal firmware instruction to detect whether the firmware binary image 105 comprises an illegal firmware instruction.

As is known to those of skill in the art, a formal property is a statement or expression that captures design behavior. For example, a simple formal property may be a=b. Within HDL designs, a formal property is an executable statement that checks for specific behavior within the HDL design. For example, if a design contains a FIFO (first in first out) buffer a formal property may be that neither overflow nor underflow of the FIFO may occur.

Formal properties are used to capture required or desired temporal behavior of the hardware design in a formal and unambiguous way. The hardware design can then be verified to determine that it conforms to the required or desired behavior as captured by one or more properties.

Formal properties are typically written in an assertion language. An assertion language, which also may be referred to as a property language, captures the design behavior over multiple design cycles in a concise, unambiguous manner. While traditional hardware description languages (HDL), such as VHDL or Verilog RTL, have the ability to capture individual cycle behavior, they are too detailed to describe properties at a higher level. In particular, assertion languages provide means to express temporal relationships and complex design behaviors in a concise manner. Assertion languages include, but are not limited to, SystemVerilog Assertions (SVA), Property Specification Language (PSL), Incisive® Assertion Library (IAL), Synopsys® OpenVera™ Assertions (OVA), Symbolic Trajectory Evaluation (STE), Hardware Property Language (HPL), 0-In®, and Open Verification Library (OVL).

A formal property may be asserted or covered. When a formal property is asserted it must always be true. In contrast, when a property is covered the property must be true at least once, but is not required to be true always. An asserted property is said to form an assertion. An example assertion of the property a=b is assert property (a=b). Similarly a covered property is said to form a cover. An example cover of the property a=b is cover property (a==b).

Formal properties are typically 'clocked', meaning that that they are only evaluated upon a clock event occurring (e.g. upon the positive edge of a clock signal or the negative edge of a clock signal). Accordingly, assertions or covers generally indicate which clock and which clock edge triggers evaluation of the formal property. An example SVA assertion of the formal property a=b is as follows:

assert (@(posedge clk) property (a==b));

It will be evident to a person of skill in the art that in the example SVA assertion above, the formal property a==b will be evaluated on the positive edge (posedge) of the clock signal (clk).

In the system of FIG. 1 the assertion evaluation logic 110 is configured to evaluate one or more assertions that asserts that if the instantiation of the hardware design 102 has stopped executing the firmware that the stopping was (or was not) preceded by a decode of an illegal firmware instruction.

In some cases, the assertion evaluation logic 110 may be configured to evaluate one or more assertions that asserts that if an instantiation of the hardware design 102 has stopped executing the firmware that a decode of an illegal firmware instruction was not detected. Such an assertion will be referred to herein as a "not-seen" assertion. In some cases the assertion evaluation logic 110 may be configured to evaluate a single "not-seen" assertion that states that if an instantiation of the hardware design 102 has stopped executing the firmware that a decode of any of the illegal firmware instructions has not been detected. In other cases the assertion evaluation logic 100 may be configured to evaluate one "not-seen" assertion for each different type of illegal firmware instruction.

For example, if the specification for the hardware design 102 identifies two types of illegal firmware instructions then the assertion evaluation logic 110 may be configured to evaluate a first assertion that states if the instantiation of the hardware design 102 has stopped executing the firmware (e.g. as indicated by the instantiation of the hardware design 102 being in a particular state (e.g. IDLE)) then a decode of the first type of illegal firmware instruction was not detected; and a second assertion that states that if the instantiation of the hardware design 102 has stopped executing the firmware (e.g. as indicated by instantiation of the hardware design 102 being in a particular state (e.g. IDLE)) then a decode of the second type of illegal firmware instruction was not detected. Configuring the assertion evaluation logic 110 to evaluate one assertion for each type of illegal firmware instruction may add complexity to the hardware monitor, but may also provide more granularity to the verification engineer because not only can such assertions provide information on whether an illegal firmware instruction has been detected, but they can also indicate which type of illegal firmware instruction was detected.

In other cases, the assertion evaluation logic 110 may be configured to, alternatively, or in addition, evaluate one or more assertions that asserts that if an instantiation of the hardware design 102 has stopped executing the firmware that a decode of a particular illegal firmware instruction was detected. Such an assertion will be referred to as a "seen" assertion. In some cases the assertion evaluation logic 110 may be configured to evaluate a single "seen" assertion that states that if an instantiation of the hardware design 102 has stopped executing the firmware that a decode of any of the illegal firmware instructions has been detected. In other cases the assertion evaluation logic 100 may be configured to evaluate one "seen" assertion for each identified type of illegal firmware instruction.

For example, if the specification for the hardware design 102 identifies two illegal firmware instructions then the assertion evaluation logic 110 may be configured to evaluate a first assertion that states if the instantiation of the hardware design 102 has stopped executing the firmware (e.g. as indicated by the instantiation of the hardware design 102 being in a particular state (e.g. IDLE)) then a decode of the first illegal firmware instruction was detected; and a second assertion that states that if the instantiation of the hardware design 102 has stopped executing the firmware (e.g. as indicated by instantiation of the hardware design 102 being in a particular state (e.g. IDLE)) then a decode of the second illegal firmware instruction was detected.

In some cases, as described in more detail below, it may be beneficial to configure the assertion evaluation logic 110 to evaluate both one or more seen assertions and one or more not-seen assertions.

It will be evident to a person of skill in the art that these are examples only and that other assertions that state a relationship between detection of a decode of an illegal firmware instruction by an instantiation of the hardware design 102 and the instantiation of the hardware design 102 being in a state indicating that firmware execution has ceased may be used to detect an illegal firmware instruction in a firmware binary image.

The hardware monitor 106 may be implemented in software. For example, the hardware monitor 106 may be implemented using a hardware description language (HDL) and/or an assertion language (e.g. System Verilog Assertions (SVA)).

The hardware monitor 106 is bound to the hardware design 102 (in which the firmware binary image 105 has been loaded) to monitor the state of the hardware design 102 to detect an illegal firmware instruction in the firmware binary image and/or to verify that the firmware binary image does not comprise an illegal firmware instruction. Where the hardware monitor 106 is implemented in SVA and the hardware design 102 is implemented in RTL, the SVA code is bound to the RTL code.

The hardware design 102 (e.g. RTL), hardware monitor 106 (e.g. SVA), and bindings, are loaded into a formal verification tool 112. The formal verification tool 112 is a software tool that is capable of performing formal verification of a hardware design. Examples of formal verification tools include, but are not limited to, OneSpin 360 DV™, Mentor Graphics Questa® Formal Verification, Synopsys VC Formal, Cadence® Incisive® Enterprise Verifier, and JasperGold®.

Formal verification is a systematic process that uses mathematical reasoning to verify a property in a hardware design. Formal verification can be contrasted to simulation-based verification in which a hardware design is tested by applying stimuli to an instantiation of the hardware design and monitoring the output of the instantiation of the hardware design in response to the stimuli.

In formal verification the hardware design (e.g. hardware design 102) is transformed into a mathematical model (e.g. a state-transition system) to thereby provide an instantiation of the hardware design which can be tested to verify the hardware design, and the formal properties (e.g. those evaluated by the assertion evaluation logic 110) are expressed using mathematical logic using a precise syntax or a language with a precise mathematical syntax and semantics.

A formal property is verified by searching the entire reachable state space of the instantiation of the hardware design (e.g. state transition system) without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

A formal property that is covered is verified by searching the reachable state space of the instantiation of the hardware design (e.g. state transition system) for at least one valid state in which the property is true. Once a valid state is found in which the property is true then the searching ceases. In contrast, a formal property that is asserted is verified by confirming the property is true for all valid states (as defined by formal constraints). In other words, an asserted property is verified by searching the reachable state space of the instantiation of the hardware design for a valid state in which the property is not true. Since formal verification of an asserted property algorithmically and exhaustively explores all valid input values over time, verifying an asserted property in this manner allows a property to be exhaustively proved or disproved for all valid states.

When the formal verification tool 112 is used to verify an assertion, the formal verification tool 112 may output an indication of whether or not the assertion is valid (i.e. is true for all valid states or sequence of states), which may also be referred to herein as the assertion being successfully verified. The output may be yes the assertion is valid or has been successfully verified; no the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 112 has run out of memory or because the formal verification tool 112 has determined that a certain amount of progress has not been made after a predefined period of time.

Where an assertion is not valid or has not been successfully verified, the formal verification tool 112 may also output information indicating a state or sequence of states of the instantiation of the hardware design 102 which caused the assertion to fail. For example, the formal verification tool 112 may output a trace of the verification indicating at what point, state or sequence of states the failure occurred.

Figure 2:
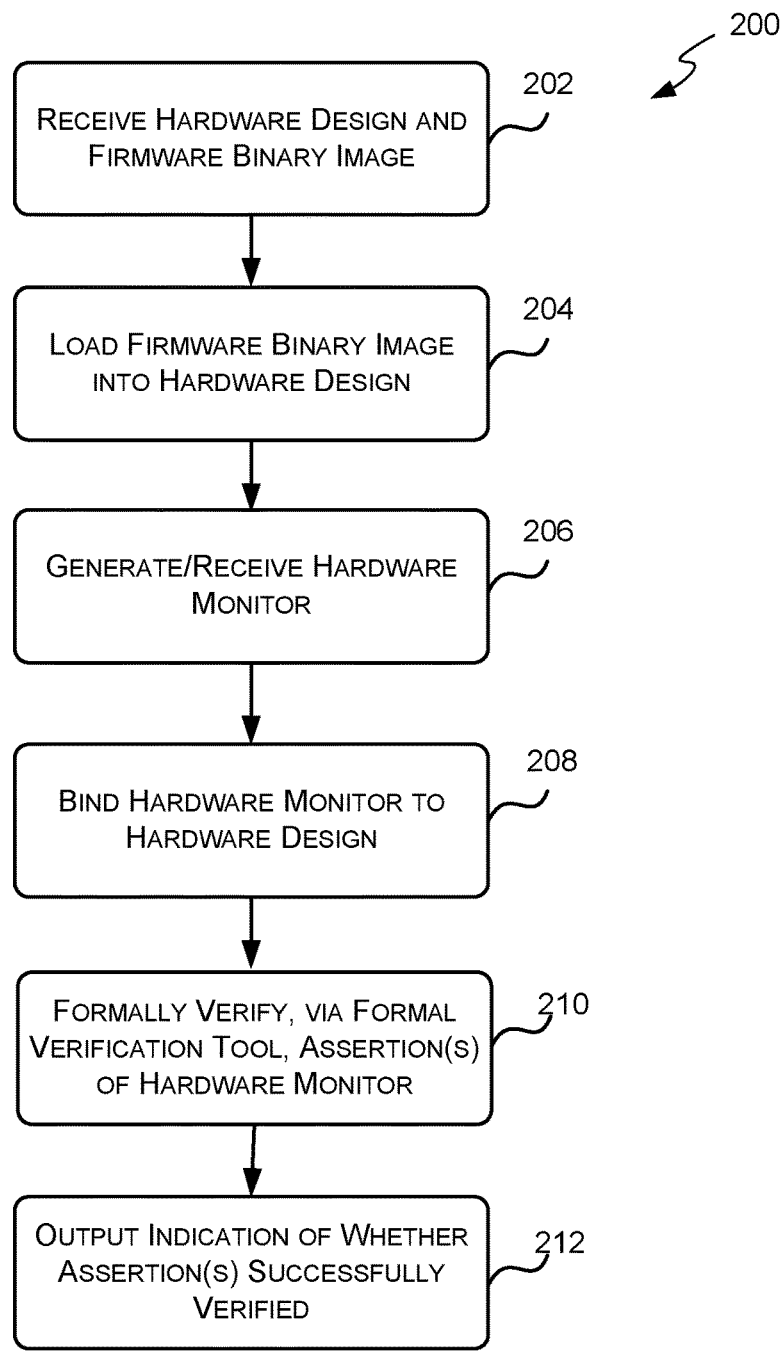
FIG. 2 is a flow diagram of an example method for detecting errors or bugs in a firmware binary image using the system of FIG. 1.

Reference is now made to FIG. 2 which illustrates a flow diagram of an example method 200 for verifying that a firmware binary image does not comprise an illegal firmware instruction. The method 200 may be implemented on a general purpose computing-based device, such as the general purpose computing-based device 700 described below with reference to FIG. 7.

The method 200 begins at block 202 where the firmware binary image 105 to be verified, and a hardware design 102 for the electronic device 104 on which the firmware binary image 105 is to be run, are received at the general purpose computing-based device 700. As described above, the hardware design 102 defines the structure and functionality of an integrated circuit to implement an electronic device 104 that is configured to execute the firmware binary image, detect an illegal firmware instruction in the firmware binary image, and stop executing the firmware binary image upon detecting an illegal firmware instruction. Once the firmware binary image 105 and the hardware design 102 have been received the method 200 proceeds to block 204.

At block 204, the firmware binary image 105 is loaded into the hardware design 102. A firmware binary image 105 is considered to be loaded into a hardware design 102 if the relevant non-volatile memory block of an instantiation of the hardware design will comprise the firmware binary image.

The firmware binary image 105 may be loaded into the hardware design 102 using any known technique. For example, the hardware design 102 may be modified to include instructions that will cause an instantiation of the hardware design 102 to load the ones and zeros of the firmware binary image directly onto the ports (e.g. signals) of the relevant non-volatile memory block. For example, if the firmware binary image is to be loaded into a ROM block (mem) of the hardware design 102, where a ROM block is an array of memory addresses, and write_enable is a signal indicating a write to the ROM, then code similar to the following may be added to the hardware design 102 to load the firmware binary image into ROM. In this example k is the number of lines in the file containing the firmware binary image.

```
for i=0 to k
    write_enable = 1;
    mem [i] = firmware_binary_image[i];
end for
```

In another example, the firmware binary image 105 may be loaded into the hardware design 102 by running a command (e.g. a Tcl command relevant to the specific formal verification tool 112) that opens a file containing the firmware binary image and transfers it to the hardware design 102 by copying the data values on the relevant ports of the non-volatile memory (e.g. ROM) block. Once the firmware binary image 105 is loaded into the hardware design 102, the method 200 proceeds to block 206.

At block 206, a hardware monitor 106 to verify that the firmware binary image 105 does not comprise illegal firmware instructions based on states of an instantiation of the hardware design 102 is generated or received. As described above, the hardware monitor 106 is configured to detect (based on one or more control and/or data signal of the hardware design) when an instantiation of the hardware design starts and/or stops executing the firmware; detect (based on one or more control and/or data signal of the hardware design) when the instantiation of the hardware design decodes an illegal firmware instruction while executing the firmware; and evaluate one or more formal assertions that assert a formal property that states that if the instantiation of the hardware design has stopped executing the firmware that the stopping was (or was not) preceded by a decode of an illegal firmware instruction to determine if the firmware binary image comprises an illegal firmware instruction.

The hardware monitor 106 may be generated, for example, by identifying from the specification of the hardware design 102 (or the specification of the firmware) (i) the illegal firmware instruction(s) and information uniquely identifying the illegal firmware instructions (e.g. their operational code (opcode) or the like); and (ii) the one or more control and/or data signals (and the status thereof) which identify that an instruction has been decoded by an instantiation of the hardware design 102; and (iii) the one or more control and/or data signals (and the status thereof) which identify that the instantiation of the hardware design has started and/or stopped executing the firmware. This information may be identified manually or automatically. For example, a verification engineer may manually identify the relevant information from the specification for the hardware design 102 or a program may be used to automatically extract the relevant information from the specification for the hardware design 102.

Once this information has been identified from the specification for the hardware design 102 a hardware monitor 106 is generated which uses the identified control signals to detect the start and/or stop of execution of the firmware by an instantiation of the hardware design 102, and to detect that an illegal firmware instruction has been decoded by the instantiation of the hardware design 102; and evaluates one or more assertions that assert a formal property that states that if the instantiation of the hardware design has stopped executing the firmware that a decode of an illegal firmware instruction was not detected to determine if the firmware binary image comprises an illegal firmware instruction.

Once the hardware monitor 106 has been generated or received the method 200 proceeds to block 208.

At block 208, the hardware monitor 106 is bound to the hardware design 102 (comprising the firmware binary image 105) to monitor the signals of the hardware design 102 to detect an illegal firmware instruction in the firmware binary image and/or to verify that the firmware binary image does not comprise an illegal firmware instruction. Where the hardware monitor 106 is implemented in SVA and the hardware design 102 is implemented in RTL, the SVA code is bound to the RTL code using, for example an SVA bind command. Once the hardware monitor 106 has been bound to the hardware design 102 (comprising the firmware binary image 105 to be verified) the method 200 proceeds to block 210.

At block 210, the hardware design 102 (e.g. RTL) (including the firmware binary image 105), hardware monitor 106 (e.g. SVA), and bindings, are loaded into a formal verification tool 112. The formal verification tool 112 is then used to formally verify the assertion(s) defined in the hardware monitor 106 for the hardware design 102. Formally verifying an assertion comprises verifying that for all valid sequences of states of the instantiation of the hardware design 102 (as defined by formal constraints) that the property is true. For example, verifying an assertion that states that if an instantiation of the hardware design 102 has stopped executing the firmware that an illegal firmware instruction was (or was not) decoded comprises determining whether there is a valid sequence of states for the instantiation of the hardware design 102 in which stopping execution of the firmware is preceded by a decode of an illegal firmware instruction.

Once the formal verification ends the method 200 proceeds to block 212.

At block 212, the formal verification tool 112 outputs one or more signals indicating whether the assertion(s) were successfully verified or not. The one or more signals identify whether the firmware binary image 105 comprises an illegal firmware instruction.

Where an asserted property has not been successfully verified the formal verification tool 112 may also output an indication of a sequence of states of the instantiation of the hardware design 102 in which the assertion is not true. The indication of the sequence of states of the instantiation of the hardware design 102 in which the assertion is not true may be used by an engineer or designer to identify the source of the illegal firmware instruction and correct the error or bug causing the illegal firmware instruction. For example, the error or bug in the firmware binary image may have been caused by an error or bug in the assembler, or the firmware binary image may have been maliciously altered after it was generated by the assembler.

Once the source of the error has been identified and corrected a new firmware binary image may be generated which may then be re-verified, using, for example, the method 200 of FIG. 2. Once it has been verified that the firmware binary image does not comprise an illegal firmware instruction the hardware design may be implemented in hardware to generate an integrated circuit as described with reference to FIG. 8 and the verified firmware binary image may then be loaded thereon.

It will be evident to a person of skill in the art that this is an example method only and that in other example methods one or more blocks of the method 200 may be omitted, combined and/or executed in a different order. For example, in other example methods blocks 202 and 204 may be replaced by a single block in which the general-purpose computing-based device 700 receives the hardware design 102 in which the firmware binary image 105 has already been loaded.

Figure 3:
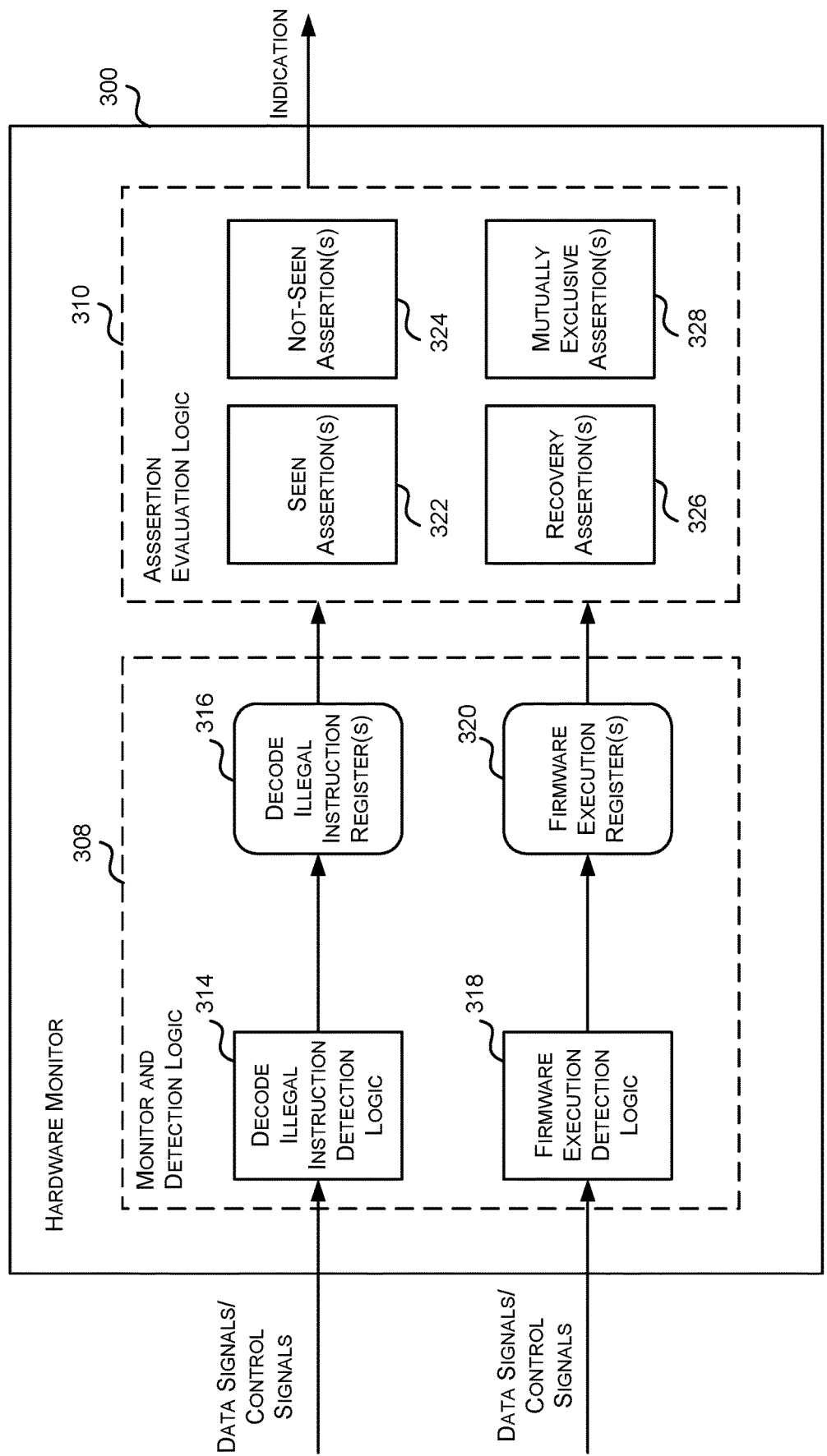
FIG. 3 is a block diagram of a first example implementation of the hardware monitor of FIG. 1 for detecting errors or bugs in a firmware binary image.

Reference is now made to FIG. 3 which illustrates a first example implementation of a hardware monitor 300, which may be used as hardware monitor 106 of FIG. 1, for verifying that a firmware binary image 105 loaded onto a hardware design 102 does not comprise illegal firmware instructions. The hardware monitor 300 of FIG. 3 detects that the firmware binary image 105 comprises illegal firmware instructions if decode of an illegal firmware instruction by an instantiation of the hardware design 102 precedes the instantiation of the hardware design 102 stopping execution of the firmware.

The hardware monitor 300 comprises monitor and detection logic 308 configured to (i) detect when an instantiation of the hardware design 102 starts and/or stops executing the firmware; and (ii) detect when the instantiation of the hardware design 102 implements a decode of an illegal firmware instruction while executing the firmware; and assertion evaluation logic 310 configured to evaluate one or more formal assertions that assert a formal property that states that if the instantiation of the hardware design has stopped executing the firmware that a decode of an illegal firmware instruction was (or was not) detected to determine if the firmware binary image comprises an illegal firmware instruction.

The monitor and detection logic 308 of FIG. 3 comprises decode illegal instruction detection logic 314 for detecting when an instantiation of the hardware design 102 decodes an illegal firmware instruction while executing the firmware and one or more decode illegal instruction registers 316 for storing the results of the detection; and firmware execution detection logic 318 for detecting when an instantiation of the hardware design 102 starts and/or stops executing the firmware, and one or more firmware execution registers 320 for storing the results of the detection.

The decode illegal instruction detection logic 314 is configured to monitor one or more control signals and/or data signals of the hardware design 102 to detect that an instantiation of the hardware design 102 implements a decode of an illegal firmware instruction while executing the firmware. The specific control signals and/or data signals that are monitored, and the status thereof indicating the instantiation of the hardware design 102 has decoded an illegal firmware instruction will vary depending on the configuration of the hardware design 102. For example, as described in more detail with respect to FIG. 5, the decode illegal instruction detection logic 314 may be configured to monitor a state signal that indicates the current state of a processor of the instantiation of the hardware design 102 to determine if the instantiation of the hardware design 102 is decoding an instruction and if so whether the opcode of the decoded instruction matches the opcode of an identified illegal firmware instruction.

The decode illegal instruction detection logic 314 may set one or more decode illegal instruction registers 316 to indicate that decode of an illegal firmware instruction has been detected and the type of illegal firmware instruction. For example, in some cases, there may be one decode illegal instruction register 316 for each type of illegal firmware instruction. In these cases, the decode illegal instruction detection logic 314 may be configured to set the decode illegal instruction register 316 associated with the type of illegal firmware instruction decoded.

The firmware execution detection logic 318 is configured to monitor one or more control signals and/or data signals of the hardware design 102 to detect when an instantiation of the hardware design 102 has started and/or stopped execution of the firmware. The specific control signals and/or data signals that are monitored, and the status thereof indicating the instantiation of the hardware design 102 has started and/or stopped execution of the firmware will vary depending on the configuration of the hardware design 102. For example, as described in more detail below with respect to FIG. 5, in some cases the hardware design 102 may be configured to cause an instantiation of the hardware design 102 to go into an IDLE state when it detects an illegal firmware instruction in boot firmware. In this case the firmware execution detection logic 318 may not be configured to explicitly detect when execution of the firmware has begun (since this is presumed on power on) but the firmware execution detection logic 318 may be configured to determine that the instantiation of the hardware design 102 has stopped executing the firmware when it detects from, for example, a state signal, that the instantiation of the hardware design 102 has gone into the IDLE state.

If the firmware execution detection logic 318 detects that the instantiation of the hardware design 102 has started or stopped execution of the firmware then the stop firmware execution detection logic 318 may set one or more firmware execution registers 320 to indicate that the instantiation of the hardware design 102 has stopped execution of the firmware. For example, where the firmware execution detection logic 318 is configured to detect both start and stop of the execution of firmware there may be two firmware execution registers—one may be set when a start is detected and the other may be set when a stop is detected. In another example the firmware execution register 320 may comprise a single multi-bit register that is set to one value when a start is detected and is set to another value when a stop is detected.

The assertion evaluation logic 310 is configured to evaluate one or more formal assertions that assert a formal property that states that if the instantiation of the hardware design has stopped execution of the firmware that an illegal firmware instruction was (or was not) decoded to determine if the firmware binary image comprises an illegal firmware instruction. In particular, the assertion evaluation logic 310 of FIG. 3 is configured to evaluate one or more assertions that state that if (based on the firmware execution register 320) the instantiation of the hardware design 102 has stopped execution of the firmware that (based on the decode illegal instruction register(s) 316) a decode of an illegal firmware instruction was (or was not) detected. Such an assertion causes the assertion evaluation logic to read the firmware execution register(s) 320 and based on the value of the firmware execution register(s) 320, read one or more decode illegal instruction register(s) 316 and output an error (or not) based on the value of the decode illegal instruction register(s) 316.

An assertion that states that if firmware execution has stopped then a decode of an illegal firmware instruction has not been detected is referred to as a "not-seen" assertion 324. In contrast, an assertion that states if firmware execution has stopped then a decode of an illegal firmware instruction has been detected is referred to as a "seen" assertion 322. The assertion evaluation logic 310 may be configured to evaluate not-seen assertion(s) 324, seen-assertions(s) 322 or both not-seen assertion(s) 324 and seen assertion(s) 322.

For example, when a seen assertion is verified by some verification tools, it will fail quite quickly and easily if an illegal firmware instruction is not present in the firmware binary image, however, if the firmware binary image does comprise an illegal firmware instruction such an assertion may take a long time to converge or may not converge at all. Conversely when a not-seen assertion is verified by the same verification tools, it will fail quite quickly and easily if the illegal firmware instruction is present in the firmware binary image, however, if the firmware binary image does not comprise the illegal firmware instruction such an assertion may take a long time to converge or may not converge at all. Accordingly, to exhaustively verify that the firmware binary image does not comprise illegal firmware instructions using such a verification tool the assertion evaluation logic 310 may be configured to evaluate both not-seen and seen assertions.

The following is example SVA code for implementing a not-seen assertion 324 where firmware_execution_register is the firmware execution register 320 which is set when the firmware execution detection logic 318 detects the instantiation of the hardware design 102 is operating in a particular state indicating that firmware execution has stopped, decode_illegal_instruction_register is the decode illegal instruction register 316 which is set when the decode illegal instruction detection logic 314 detects that an illegal firmware instruction has been decoded by an instantiation of the hardware design 102.

```
'define clk_rst @(posedge clk) disable iff (!resetn)
assert property ('clk_rst
    firmware_execution_register
    |-> !decode_illegal_instruction_register
```

It will be evident to a person of skill in the art that the above SVA code states that if the instantiation of the hardware design has stopped executing the firmware (firmware_execution_register) then (|->) decode of an illegal firmware instruction (while executing the firmware) was not detected (!decode_illegal_instruction_register).

As described above, when a formal verification tool 112 formally verifies such an assertion it verifies that there is not a series of states of the instantiation of the hardware design in which the assertion is not true. In other words, the formal verification tool 112 verifies that there is not a valid sequence of states of the instantiation of the hardware design 102 where an instantiation of the hardware design 102 will stop executing the firmware as a result of decoding an illegal firmware instruction while executing the firmware. If there is at least one valid sequence of states in which the assertion is not true then the assertion will fail and the formal verification tool 112 outputs an indication that the assertion is not true (and, possibly, an indication of the sequence of states that caused the assertion to fail).

In some cases the assertion evaluation logic 310 may also be configured to evaluate one or more assertions that verify that an instantiation of the hardware design 102 will respond as expected to illegal firmware instructions in the firmware (i.e. the instantiation of the hardware design 102 stops executing the firmware). For example, the assertion evaluation logic 310 may be configured to evaluate an assertion that states that if (based on the decode illegal instruction register(s) 316) that an instantiation of the hardware design has decoded an illegal firmware instruction that (based on the firmware execution register 320) the instantiation of the hardware design 102 stops executing the firmware to confirm that it will bail out of the firmware execution upon encountering an illegal firmware instruction. Such an assertion is referred to herein as a recovery assertion 326. An example of a recovery assertion will be described with reference to FIG. 5.

The assertion evaluation logic 310 may alternatively, or in addition, be configured to evaluate one or more assertions that states that if (based on a particular decode illegal instruction register 316) a decode of a particular illegal firmware instruction has been detected that (based on the other decode illegal instruction registers 316) a decode of another illegal firmware instruction does not occur to confirm that once an illegal firmware instruction has been encountered that another illegal firmware instruction will not be encountered. Such an assertion is referred to herein as a mutually exclusive assertion 328.

Although, not shown in FIG. 3, it will be evident to a person of skill in the art that the logic blocks (e.g. decode illegal instruction detection logic 314, firmware execution detection logic 318 and assertion evaluation logic 310) may be triggered by a clock. For example, one or more of the logic blocks may be triggered by the rising or positive edge of the clock. Furthermore, it will be evident to a person of skill in the art that one or more of the logic blocks (e.g. decode illegal instruction detection logic 314, firmware execution detection logic 318, and assertion evaluation logic 310) may be combined or their functionality may divided between logic blocks in another manner.

Figure 4:
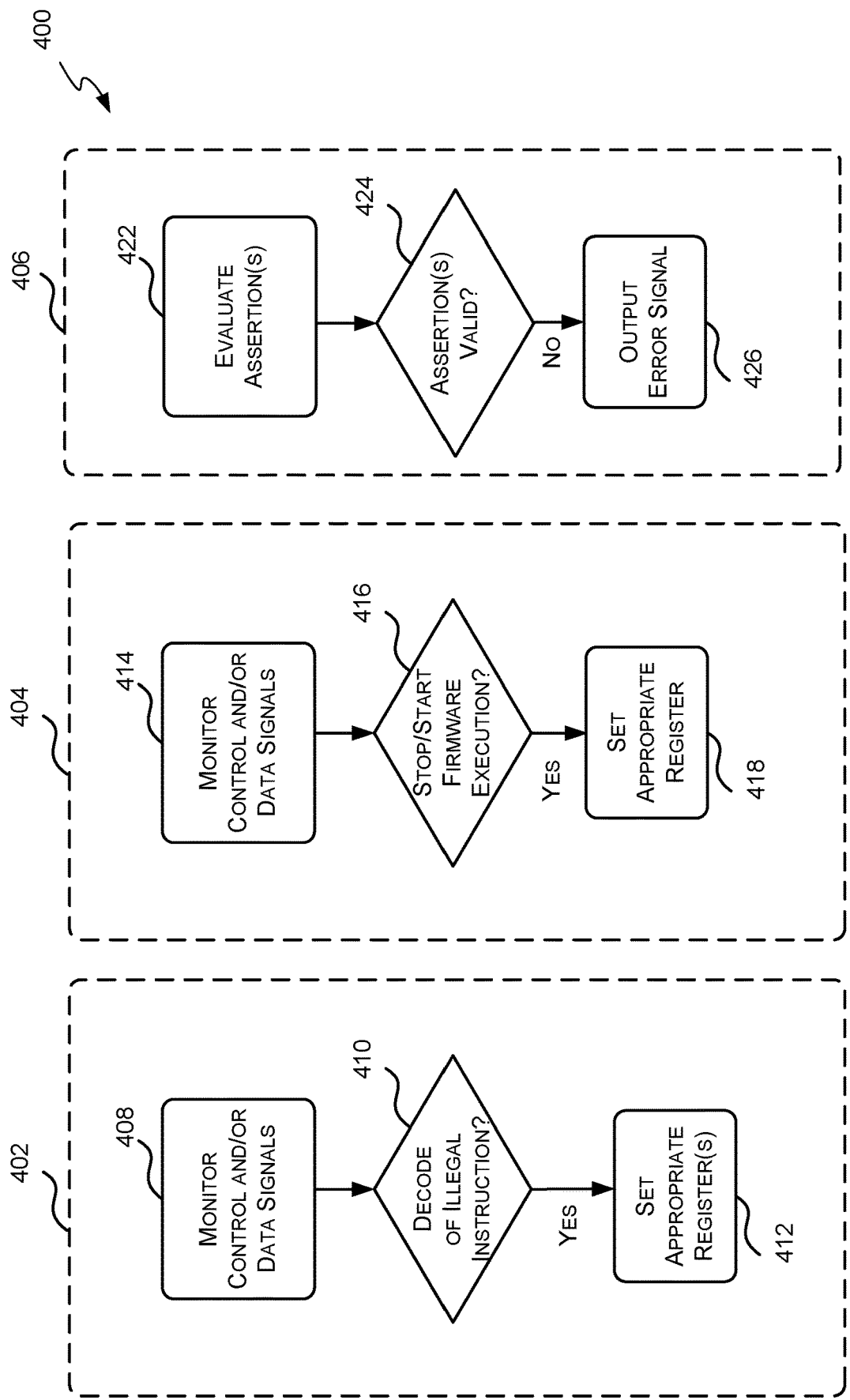
FIG. 4 is a flow diagram of an example method for detecting errors or bugs in a firmware binary image using the hardware monitor of FIG. 3.

Reference is now made to FIG. 4 which illustrates an example method 400 for detecting illegal firmware instructions in a firmware binary image which may be implemented by the hardware monitor 300 of FIG. 3. The method 400 detects illegal firmware instructions in a firmware binary image by monitoring the state of an instantiation of a hardware design 102 for a computing electronic device to execute the firmware. The method 400 is divided into three sub-processes 402, 404 and 406 that are executed concurrently.

In the first sub-process 402, the decode illegal instruction detection logic 314 is triggered each clock cycle to monitor one or more control signals and/or data signals of the hardware design 102 (block 408); determine, based on the status of the monitored control and/or data signals, whether an instantiation of the hardware design 102 has implemented a decode of an illegal firmware instruction (block 410); and, in response to determining the instantiation of the hardware design has implemented a decode of an illegal firmware instruction, setting the appropriate decode illegal instruction register(s) 316 to reflect the detection (block 412). The specific control signals and/or data signals and the status thereof that indicate that an instantiation of the hardware design 102 has decoded an illegal firmware instruction depends on the configuration of the hardware design 102 and which instructions have been identified as illegal firmware instructions.

In the second sub-process 404, the firmware execution detection logic 318 is triggered each clock cycle to monitor one or more control signals and/or data signals of the hardware design 102 (block 414); determine, based on the monitored control and/or data signals, whether an instantiation of the hardware design 102 has started or stopped executing the firmware (block 416); and if so, setting the appropriate firmware execution register(s) 320 (block 418). The specific control signals and/or data signals and the status thereof that indicate that an instantiation of the hardware design 102 has started or stopped executing the firmware depends on the configuration of the hardware design 102.

In the third sub-process 406, the assertion evaluation logic 310 is triggered each clock cycle to evaluate the one or more assertions defined therein (e.g. seen assertions, not-seen assertions, mutually exclusive assertions and/or recovery assertions) (block 422), and determine if all of the assertions hold, or are true for the hardware design 102 (block 424). If one or more assertions are not true then an error message or signal is output (block 426).

In the method 400 of FIG. 4 processes 402, 404 and 406 are triggered each clock cycle. In some cases the processes 402, 404 and 406 may be triggered by the rising or positive edge of a clock or the falling or negative edge of a clock. In other examples the processes 402, 404 and 406 may be triggered by another event.

Figure 5:
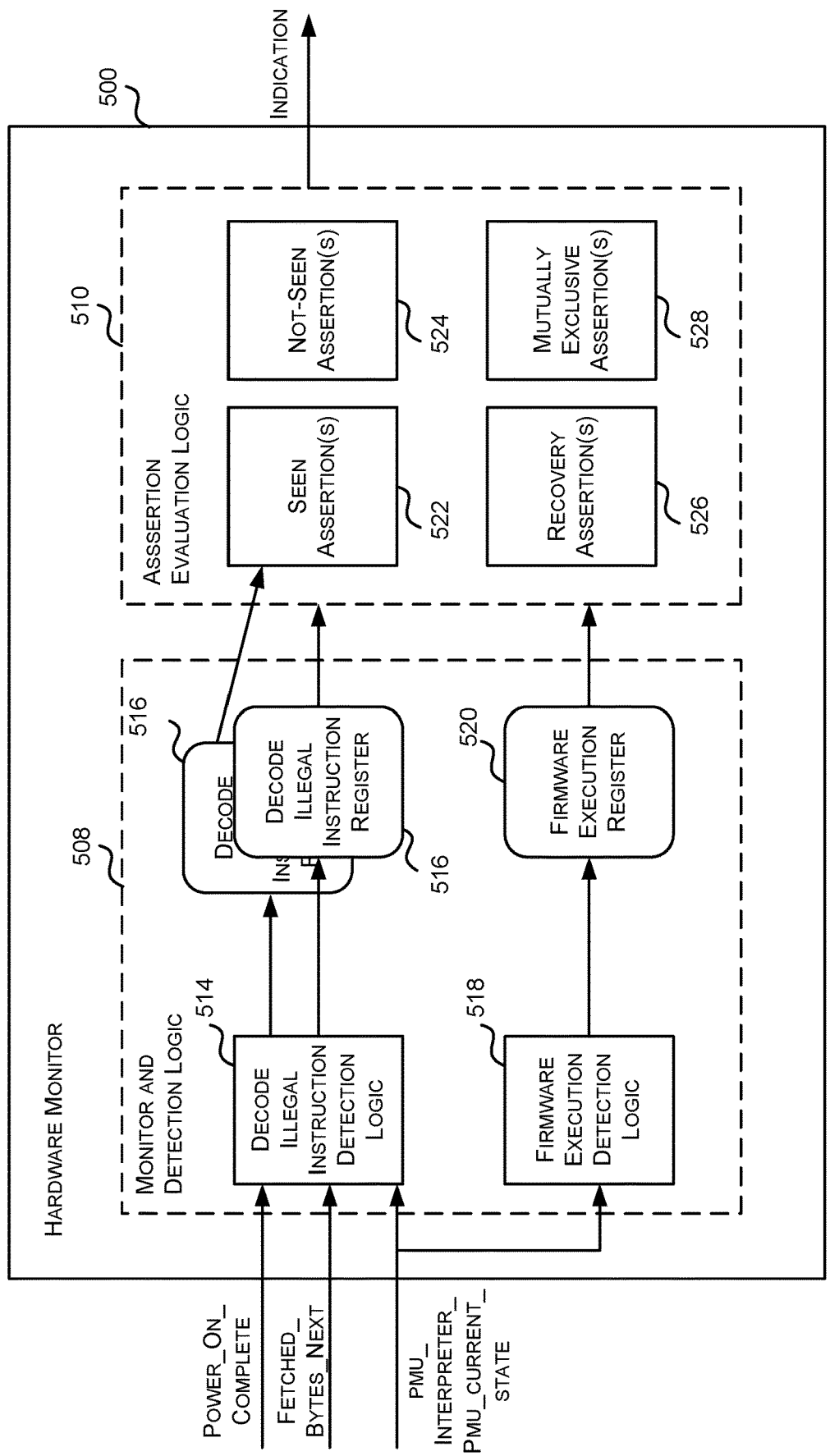
FIG. 5 is a block diagram of a second example implementation of the hardware monitor of FIG. 1 for detecting errors or bugs in a firmware binary image.

Reference is now made to FIG. 5 which illustrates a second example implementation of a hardware monitor 500, which may be used as hardware monitor 106 of FIG. 1, for verifying that a firmware binary image 105 loaded onto a hardware design 102 does not comprise illegal firmware instructions. The hardware monitor 500 of FIG. 5 is designed to test the boot firmware for a power management unit (PMU) where the instruction interpreter of the PMU is configured to go into an IDLE state if the instruction interpreter identifies an illegal firmware instruction while executing the firmware. In this example the illegal firmware instructions include function pointer instructions (e.g. call function pointer instruction, set function pointer instruction, set function pointer index instruction, or jump function pointer instruction) since function pointer results will not be ready at this point; and return external instructions without a prior call external instruction since a program cannot return from an external call without first making an external call.

As is known to those of skill in the art a function pointer is a variable that stores the address of a function that can later be called through that function pointer. A call function pointer instruction jumps to the address held in a specified function pointer; a set function pointer instruction sets a selected function pointer to a particular supplied address; a set function pointer index instruction sets a function pointer, indexed by a specified value, to a particular supplied address; and, a jump function pointer instruction jumps to the address held in the function pointer which is index by a specified value.

In some cases the illegal firmware instructions may also include a jump instruction that jumps to an out-of-bounds memory address. In particular, the electronic device 100 (e.g. PMU) may be configured to only access one or more block(s) of memory, which are referred to herein as allowable blocks of memory, while it is executing the firmware. Each allowable block of memory is defined by an allowable memory address range. If the electronic device 100 accesses memory that is not in an allowable memory block then there has been an out-of-bounds memory access violation, which may be referred to herein as an out-of-bounds violation. If firmware comprises a jump instruction that will cause the processing element to jump to an instruction at a memory address that does not fall within an allowable memory address range then the firmware includes a jump instruction that jumps to an out-of-bounds memory address.

For example, the electronic device 100 may be configured to only access BOOT ROM while it is executing the firmware. If the firmware for such an electronic device 100 includes a jump instruction that jumps to a memory address that is not in BOOT ROM (e.g. that is RAM) then the firmware includes a jump instruction that jumps to an out-of-bounds memory address.

The hardware monitor 500 comprises monitor and detection logic 508 configured to (i) detect when an instantiation of the hardware design stops executing the firmware (since the firmware is executed on power on the hardware monitor 500 does not explicitly detect the start of execution of the firmware); and (ii) detect when the instantiation of the hardware design 102 decodes an illegal firmware instruction while executing the firmware; and assertion evaluation logic 510 configured to evaluate one or more formal assertions that assert a formal property that states that if the instantiation of the hardware design 102 has stopped executing the firmware that a decode of an illegal firmware instruction was (or was not) detected to determine if the firmware binary image comprises an illegal firmware instruction.

The monitor and detection logic 508 of FIG. 5 comprises decode illegal instruction detection logic 514 for detecting when an instantiation of the hardware design 102 decodes an illegal firmware instruction while executing the firmware, and one decode illegal instruction register 516 for each different illegal firmware instruction for storing the results of the detection; and firmware execution detection logic 518 for detecting when an instantiation of the hardware design 102 stops the execution of the firmware, and a firmware execution register 520 for storing the results of the detection.

The decode illegal instruction detection logic 514 is configured to detect, based on the status of one or more control and/or data signals of the hardware design 102, when an instantiation of the hardware design 102 decodes an illegal firmware instruction. For example, the decode illegal instruction detection logic 514 may be configured to detect, based on the pmu_interpreter.pmu_current_state_signal (indicating the current state of the instruction interpreter—e.g. whether the interpreter is in the decode state), the power_on__complete signal (indicating whether the power on sequence is complete) whether an instantiation of the hardware design 102 implements a decode of an instruction while executing the firmware.

If the decode illegal instruction detection logic 514 detects from the monitored control and/or data signals that the instantiation of the hardware design 102 has implemented a decode of an instruction, then the decode illegal instruction detection logic 514 may compare the opcode of the decoded instruction (e.g. from the fetched_bytes_next signal which comprises the decoded instruction) to the opcodes of the illegal firmware instructions. It will be evident that this is an example only and that other control and/or data signals may be monitored to determine that the instantiation of the hardware design 102 has decoded an illegal firmware instruction.

If the decode illegal instruction detection logic 514 detects a decode of a particular type of illegal firmware instruction then the corresponding decode illegal instruction register 516 is set to indicate that a decode of that type of illegal firmware instruction has been detected The following is example SVA code for implementing the decode illegal instruction detection logic 514 to detect decode of a jump function pointer, call function pointer, set function pointer, and set function pointer index instruction. In this example seen_JUMP_FP, seen_CALL_FP, seen_SET_FP, seen_SET_FP_I are four of the decode illegal instruction registers 516 and are set by the decode illegal instruction detection logic 514 when a jump function pointer, call function pointer, set function pointer, and set function pointer index instruction has been decoded respectively.

```
always @(posedge clk or negedge resetn)
    if (!resetn)
        seen_JUMP_FP <= 1'b0;
    else if (!power_on_complete &&
        (pmu_interpreter.pmu_current_state ==
        pmu_decode_inst_s0) && (fetched_bytes_next[5:0]
        == JUMP_FP))
        seen_JUMP_FP <= 1'b1;
always @(posedge clk or negedge resetn)
    if (!resetn)
        seen_CALL_FP <= 1'b0;
    else if (!power_on_complete &&
        (pmu_interpreter.pmu_current_state ==
        pmu_decode_inst_s0) && (fetched_bytes_next[5:0]
        == CALL_FP))
        seen_CALL_FP <= 1'b1;
always @(posedge clk or negedge resetn)
    if (!resetn)
        seen_SET_FP <= 1'b0;
    else if (!power_on_complete &&
        (pmu_interpreter.pmu_current_state ==
        pmu_decode_inst_s0) && (fetched_bytes_next[5:0]
        == SET_FP))
        seen_SET_FP <= 1'b1;
always @(posedge clk or negedge resetn)
    if (!resetn)
        seen_SET_FP_I <= 1'b0;
    else if (!power_on_complete &&
        (pmu_interpreter.pmu_current_state ==
        pmu_decode_inst_s0) && (fetched_bytes_next[5:0]
        == SET_FP_I))
        seen_SET_FP_I <= 1'b1;
```

It will be evident to a person of skill in the art that the above code configures the decode illegal instruction detection logic 514 to set the corresponding decode illegal instruction register 516 when the instantiation of the hardware design 102 has decoded an instruction while executing the firmware ((!power_on_complete && (pmu_interpreter.pmu_current_state==pmu_decode_inst_s0) and the opcode of the instruction (fetched_bytes_next [5:0]) matches the opcode of a particular type of illegal firmware instruction (JUMP_FP, CALL_FP, SET_FP, SET_FP_I).

The following is example SVA code for configuring the decode illegal instruction detection logic 514 to detect decode of an illegal return instruction (i.e. decode of a return external instruction without a preceding call external instruction). In this example seen_CALL_EXT, and seen_RET_EXT are two of the decode illegal instruction registers 516.

```
always @(posedge clk or negedge resetn)
    if (!resetn)
        seen_CALL_EXT <= 1'b0;
    else if (!power_on_complete &&
        (pmu_interpreter.pmu_current_state ==
```

-continued

```
        pmu_decode_inst_s0) && (fetched_bytes_next[5:0]
            == CALL_EXTERNAL))
    seen_CALL_EXT <= 1'b1;
always @(posedge clk or negedge resetn)
    if (!resetn)
        seen_RET_EXT <= 1'b0;
    else if (!power_on_complete &&
        (pmu_interpreter.pmu_current_state ==
        pmu_decode_inst_s0) && (fetched_bytes_next[5:0]
            == RETURN_EXTERNAL) && !seen_CALL_EXT)
        seen_RET_EXT <= 1'b1;
```

It will be evident to a person of skill in the art that the above code configures the decode illegal instruction detection logic 514 to set the seen_CALL_EXT register when the instantiation of the hardware design 102 has decoded an instruction while executing the firmware

```
((!power_on_complete &&
    (pmu_interpreter.pmu_current_state == pmu_decode_inst_s0)
``` and the opcode of the decoded instruction (fetched_bytes_next [5:0]) matches the opcode of a call external instruction (CALL_EXTERNAL). The above code also configures the decode illegal instruction logic 514 to set the seen_RET_EXT register when the instantiation of the hardware design 102 has decoded an instruction while executing the firmware

```
((!power_on_complete &&
    (pmu_interpreter.pmu_current_state == pmu_decode_inst_s0)
``` and the opcode of the decoded instruction (fetched_bytes_next [5:0]) matches the opcode of a return external instruction (RETURN_EXTERNAL) and a call external instruction has not already been decoded (!seen_CALL_EXT).

The following is example SVA code for configuring the decode illegal instruction detection logic 514 to detect a decode of an illegal jump instruction (i.e. a jump instruction that jumps to an out-of-bounds memory address). In this example seen_out_of_bounds is one of the decode illegal instruction registers 516, pmu_intepreter.r.pc is the program counter, and POSROM_SIZE_BYTES.

```
wire seen_jump_i_exec;
wire [15:0] r_pc;
reg seen_out_of_bounds;
assign seen_jump_i_exec =
    (pmu_interpreter.pmu_current_state ==
    pmu_execute_jump_i_s0);
assign r_pc = pmu_interpreter.r_pc;
always @(posedge clk or negedge resetn)
    if (!resetn)
        seen_out_of_bounds <= 1'b0;
    else if (!power_on_complete && seen_jump_i_exec
        && (r_pc > POSROM_SIZE_BYTES))
        seen_out_of_bounds <= 1'b1;
```

It will be evident to a person of skill in the art that the above code configures the decode illegal instruction detection logic 514 to set the seen_out_of_bounds register when the instantiation of the hardware design 102 is executing the firmware (!power_on_complete) and has decoded a jump instruction (seen_jump_i_exec) that jumps to an out of bounds memory address (r_pc>POSROM SIZE BYTES).

The firmware execution detection logic 518 is configured to monitor one or more control signals and/or data signals of the hardware design 102 to detect when an instantiation of the hardware design 102 has stopped executing the firmware (since the firmware in this example is boot firmware the start of execution of the firmware is not explicitly detected). In the example of FIG. 5 the firmware execution detection logic 518 is configured to detect that an instantiation of the hardware design 102 has stopped executing the firmware when it sees (from the pmu_interpreter.pmu_current_state_signal) that the PMU interpreter has gone into the IDLE state. If the firmware execution detection logic 518 detects that execution of the firmware has stopped the firmware execution detection logic 518 sets the firmware execution register 520 to indicate that it has detected that execution of the firmware has stopped.

The following is a first SVA code example for implementing the firmware execution detection logic 518 of FIG. 5. In this example, the firmware execution detection logic 518 is configured to initialize the firmware execution register to zero, set the firmware execution register 520 (count_IDLE in this example) to one the first time it sees the PMU interpreter go into the IDLE state, and set the firmware execution register to two when it subsequently sees the PMU interpreter go into the IDLE state (pmu_idle).

```
reg [1:0] count_IDLE;
    always @(posedge clk or negedge resetn)
        if (!resetn)
            count_IDLE <= 2'b00;
        else if (count_IDLE==0) begin
            if (pmu_interpreter.pmu_current_state ==
                pmu_idle) begin
                count_IDLE <= 2'b01;
            end
        end
        else if (count_IDLE==2'b01) begin
            count_IDLE <= 2'b10; end
```

The following is a second SVA code example for implementing the firmware execution detection logic 518 of FIG. 5. In this example, the firmware execution detection logic 518 is configured to initialize the firmware execution register 520 (seen_IDLE in this example) to zero and then set the firmware execution register 520 (seen_IDLE) to one when it detects that the PMU interpreter has gone into the IDLE state.

```
always @(posedge clk or negedge resetn)
    if (!resetn)
        seen_IDLE <= 1'b0;
    else if (pmu_interpreter.pmu_current_state ==
        pmu_idle)
        seen_IDLE <= 1'b1;
```

The assertion evaluation logic 510, like the assertion evaluation logic 310 of FIG. 3, is configured to evaluate one or more formal assertions that assert a formal property that states that if the instantiation of the hardware design has stopped executing the firmware that an illegal firmware instruction was (or was not) decoded to determine if the firmware binary image comprises an illegal firmware instruction. In particular, the assertion evaluation logic 510 of FIG. 5 is configured to evaluate one or more "not-seen" assertions 524 and/or one or more "seen" assertions 522.

The following is example SVA code for implementing a set of not-seen assertions 524 that each state that if firmware execution has stopped that decode of one of the types of illegal firmware instructions has not been detected. In these examples count_IDLE is the firmware execution register 520 which is set to one when the firmware execution detection logic 518 detects that execution of the firmware has stopped, and seen_JUMP_FP, seen_CALL_FP, seen_SET_FP, seen_SET_FP_I and seen_RET_EXT are the decode illegal instruction registers 516 which are set to one when decode of the corresponding type of illegal firmware instruction is detected by the decode illegal instruction logic 514.

```
'define clk_rst @(posedge clk) disable iff (!resetn)
as_JUMP_FP_never_seen:
    assert property ('clk_rst (count_IDLE == 2'h1)
        |-> !seen_JUMP_FP);
as_CALL_FP_never_seen:
    assert property ('clk_rst (count_IDLE == 2'h1)
        |-> !seen_CALL_FP);
as_SET_FP_never_seen:
    assert property ('clk_rst (count_IDLE == 2'h1)
        |-> !seen_SET_FP);
as_SET_FP_I_never_seen:
    assert property ('clk_rst (count_IDLE == 2'h1)
        |-> !seen_SET_FP_I);
as_RET_EXT_never_seen:
    assert property ('clk_rst (count_IDLE == 2'h1)
        |-> !seen_RET_EXT);
```

It will be evident to a person of skill in the art that each of the above assertions state that if the instantiation of the hardware design has stopped executing the firmware (count_IDLE==2'h1) then (|->) a decode of a particular illegal firmware instruction (while executing the firmware) was not detected

```
(!seen_JUMP_FP, !seen_CALL_FP, !seen_SET_FP,
!seen_SET_FP_
I, or !seen_RET_EXT).
```

A set of seen assertions 522 can be generated from the above not-seen assertions 524 by replacing the NOT requirements (!seen_JUMP_FP, !seen_CALL_FP, !seen_SET_FP, !seen_SET_FP_I, or ! seen_RET_EXT) with the positive requirements (seen_JUMP_FP, seen_CALL_FP, seen_SET_FP, seen_SET_FP_I, or seen_RET_EXT.

As is known to those of skill in the art SVA has a built-in operator, $rose (x), which compares the previous value of x to the current value of x. If x was previously low and now is high then $rose (x) is true. The seen and not-seen assertions can be amended to replace count_idle==1 with $rose (seen_idle) which may provide some performance benefits for some formal verification tools.

In some cases the assertion evaluation logic 510 may also be configured to evaluate one or more assertions that verify that an instantiation of the hardware design 102 responds as expected to illegal firmware instructions in the firmware (i.e. stops executing the firmware). For example, the assertion evaluation logic 510 may be configured to evaluate an assertion that states that if (based on the decode illegal instruction register(s) 516) that an instantiation of the hardware design has decoded an illegal firmware instruction that (based on the firmware execution register 520) the instantiation of the hardware design stops executing the firmware to confirm that it will bail out of the firmware execution upon encountering an illegal firmware instruction. As described above such an assertion is referred to herein as a recovery assertion 526.

The following is example SVA code for a recovery assertion 526 which states that if an illegal firmware instruction has been decoded that the instantiation of the hardware design 102 will go into an IDLE state for four cycles afterwards.

```
as_if_illegal_then_IDLE_4CYC_AFTER:
    assert property('clk_rst (seen_JUMP_FP || seen_SET_FP
        || seen_CALL_FP || seen_SET_FP_I ||
        seen_RET_EXT) |-> ##4 seen_IDLE);
```

The assertion evaluation logic 510 may alternatively, or in addition, be configured to evaluate one or more assertions that states that if (based on a particular decode illegal instruction register 516) a decode of a particular illegal firmware instruction has been detected that (based on the other decode illegal instruction registers 516) a decode of another illegal firmware instruction does not occur to confirm that once an illegal firmware instruction has been encountered that another illegal firmware instruction will not be encountered. As described above such an assertion is referred to herein as a mutually exclusive assertion 528.

The following is example SVA code for implementing a set of mutually exclusive assertions 528. Each mutually exclusive assertion states that if a particular type of illegal instruction has been decoded then another type of illegal firmware instruction will not be decoded.

```
as_ret_ext_mutually_exclusive:
    assert property ('clk_rst seen_RET_EXT
        |-> !seen_SET_FP && !seen_JUMP_FP
        && !seen_CALL_FP && !seen_SET_FP_I
as_jump_fp_mutually_exclusive:
    assert property ('clk_rst seen_JUMP_FP
        |-> !seen_SET_FP && !seen_RET_EXT
        && !seen_CALL_FP && !seen_SET_FP_I
as_call_fp_mutually_exclusive:
    assert property ('clk_rst seen_CALL_FP
        |-> !seen_SET_FP && !seen_JUMP_FP
        && !seen_RET_EXT && !seen_SET_FP_I
as_set_fp_mutually_exclusive:
    assert property ('clk_rst seen_SET_FP
        |-> !seen_RET_EXT && !seen_JUMP_FP
        && !seen_CALL_FP && !seen_SET_FP_I
as_set_fpi_mutually_exclusive:
    assert property ('clk_rst seen_SET_FP_I
        |-> !seen_SET_FP && !seen_RET_EXT
        && !seen_CALL_FP && !seen_JUMP_FP
```

Although, not shown in FIG. 5, it will be evident to a person of skill in the art that the logic blocks (e.g. decode illegal instruction detection logic 514, firmware execution detection logic 518 and assertion evaluation logic 510) may be triggered by a clock. For example, one or more of the logic blocks may be triggered by the rising or positive edge of the clock. Furthermore, it will be evident to a person of skill in the art that one or more of the logic blocks (e.g. decode illegal instruction detection logic 514, stop firmware execution detection logic 518, and assertion evaluation logic 510) may be combined or their functionality may divided between logic blocks in another manner.

As described above, when a formal verification tool 112 formally verifies an assertion it verifies that there is not a series of states of the instantiation of the hardware design in which the assertion is not true. If there is at least one valid sequence of states in which the assertion is not true then the assertion will fail and the formal verification tool 112 outputs an indication that the assertion is not true (and, possibly, an indication of the sequence of states that caused the assertion to fail).

In some cases the assertion evaluation logic 510 may also be configured to evaluate a cover (or a similar assertion) that states that the stop state will occur at least once. This reduces the proof steps and helps produce results on the key assertions (e.g. the seen assertions and not-seen assertions). The following is an example of logic which counts the number of times a PMU goes into the IDLE state and states that the count will not be less than zero.

```
reg [1:0] max_count_IDLE;
always @(posedge clk or negedge resetn)
if (!resetn)
    max_count_IDLE <= 'h0;
else if (($past(pmu_interpreter.pmu_current_state)
    != pmu_idle) &&
    (pmu_interpreter.pmu_current_state ==
    pmu_idle))
    max_count_IDLE <= max_count_IDLE + 1'b1;
cover property (max_count_IDLE > 0);
```

Testing has shown that since the seen assertions and not-seen assertions are guarded by count_IDLE==1 in the antecedent, the formal verification tool 112 is able to use the cover to skip a few states and to focus on states close to the states that are reachable from when count_IDLE==1 is true. Because failure of an assertion only requires establishing at least one sequence of states that cause the asserted property to fail this results in the seen and not-seen assertions converging quite quickly. In other words, configuring the assertion evaluation logic to evaluate such a cover (or a similar assertion) may reduce the time it takes to converge and thus reduce the verification time.

Figure 6:
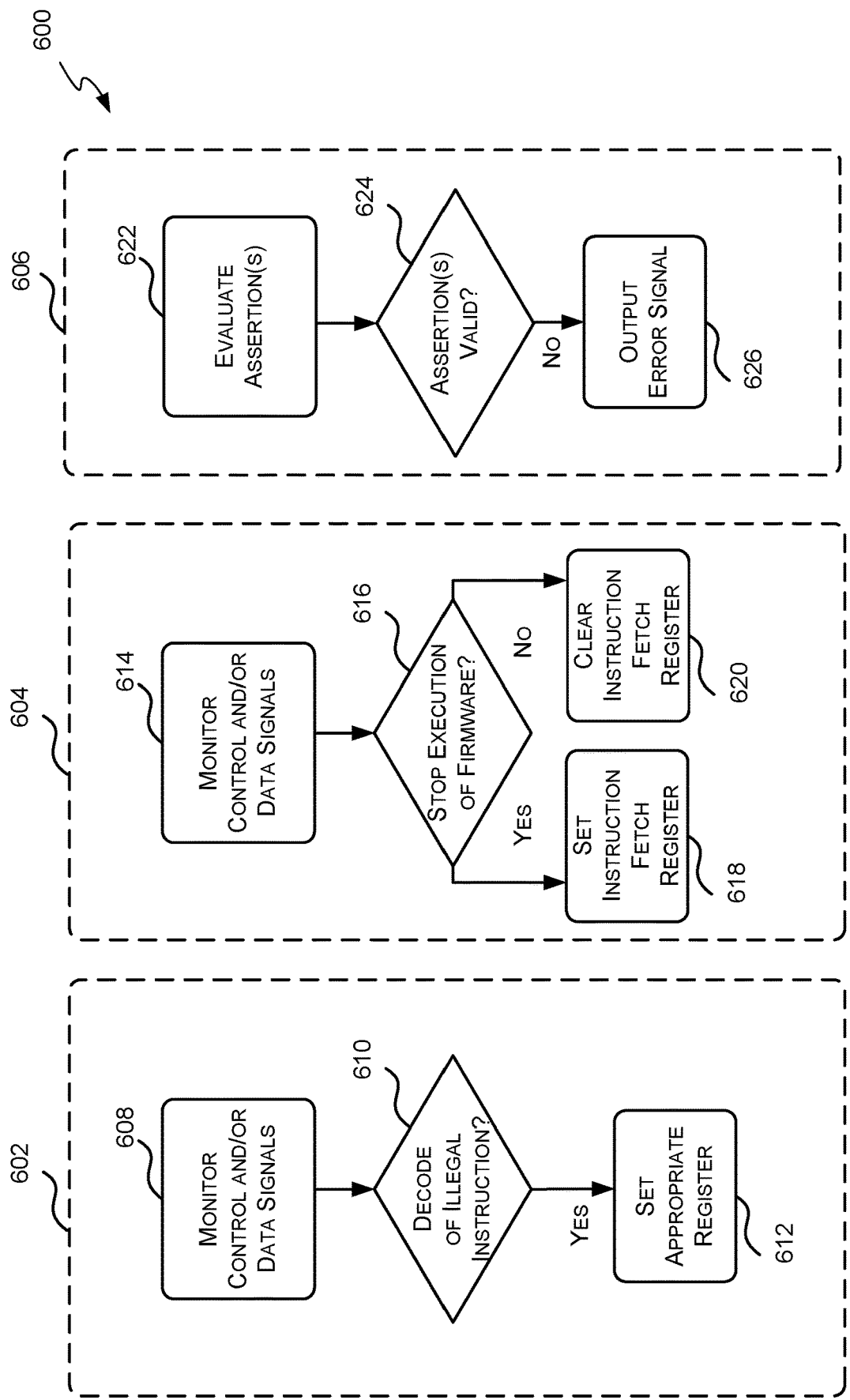
FIG. 6 is a flow diagram of an example method for detecting errors or bugs in a firmware binary image using the hardware monitor of FIG. 5.

Reference is now made to FIG. 6 which illustrates an example method 600 for detecting illegal firmware instructions in a firmware binary which may be implemented by the hardware monitor 500 of FIG. 5. The method 600 detects illegal firmware instructions in a firmware binary image by monitoring the state of an instantiation of a hardware design 102 for hardware configured to execute the firmware. The method 600 is divided into three sub-processes 602, 604 and 606 that are executed concurrently.

In the first sub-process 602, the decode illegal instruction detection logic 514 is triggered each clock cycle to monitor one or more control signals and/or data signals of the hardware design 102 (block 608); determine, based on the status of the monitored control and/or data signals, whether an in instantiation of the hardware design 102 has implemented a decode of an illegal firmware instruction (block 610); and, in response to detecting a decode of an illegal firmware instruction, setting the appropriate decode illegal instruction register(s) 516 to reflect the detection (block 612). The specific control signals and/or data signals and the status thereof that indicate that an instantiation of the hardware design 102 has decoded an illegal firmware instruction depends on the configuration of the hardware design 102 and which instructions have been identified as illegal firmware instructions.

In the second sub-process 604, the firmware execution detection logic 518 is triggered each clock cycle to monitor one or more control signals and/or data signals of the hardware design 102 (block 614); determine, based on the monitored control and/or data signals, whether an instantiation of the hardware design 102 has stopped executing the firmware (block 616), if so, setting the appropriate firmware execution register(s) 520 (block 618), and if not, clearing the appropriate firmware execution register(s) 520 (block 620). The specific control signals and/or data signals and the status thereof that indicate that an instantiation of the hardware design 102 has stopped executing the firmware depends on the configuration of the hardware design 102.

In the third sub-process 606, the assertion evaluation logic 510 is triggered each clock cycle to evaluate the one or more assertions defined therein (block 622), and determine if all of the assertions hold, or are true (block 624). If one or more assertions are not true then an error message or signal is output (block 626).

In the method 600 of FIG. 6 processes 602, 604 and 606 are triggered each clock cycle. In some cases the processes 602, 604 and 606 may be triggered by the rising or positive edge of a clock or the falling or negative edge of a clock. In other examples the processes 602, 604 and 606 may be triggered by another event.

Although the above examples describe using a hardware monitor 106, 300 and 500 to detect an illegal firmware instruction in a firmware binary image using a hardware design 102 by formally verifying the assertion(s) defined in the hardware monitor 106, 300 and 500 using a formal verification tool 112, in other examples the hardware monitor 106, 300 or 500 (including the assertion(s) defined therein) may be synthesised into hardware (e.g. an integrated circuit) as part of, or in connection with, the hardware design 102. In these examples the assertion(s) of the hardware monitor 106, 300, or 500 act as a monitor during operation of the hardware. In particular, when the hardware (e.g. electronic device) executes the firmware binary image 105 the hardware monitor 106, 300, or 500 periodically evaluates the assertion(s) (e.g. upon the positive edge of the clock signal).

If the hardware monitor 106, 300, or 500 detects that an assertion has failed or is not true then the hardware monitor 106, 300 or 500 may generate a signal indicating an illegal firmware instruction has been detected in the firmware binary image. This can improve observability by being able to identify an illegal firmware instruction as soon as it is detected. Without such assertion(s) illegal firmware instructions may only be identified in simulation-based verification or during operation if it propagates to an observable output and then it is only evident at the end of the simulation. By using one or more assertions, illegal firmware instructions in a firmware binary image can be detected and observed instantly, at its source.

Figure 7:
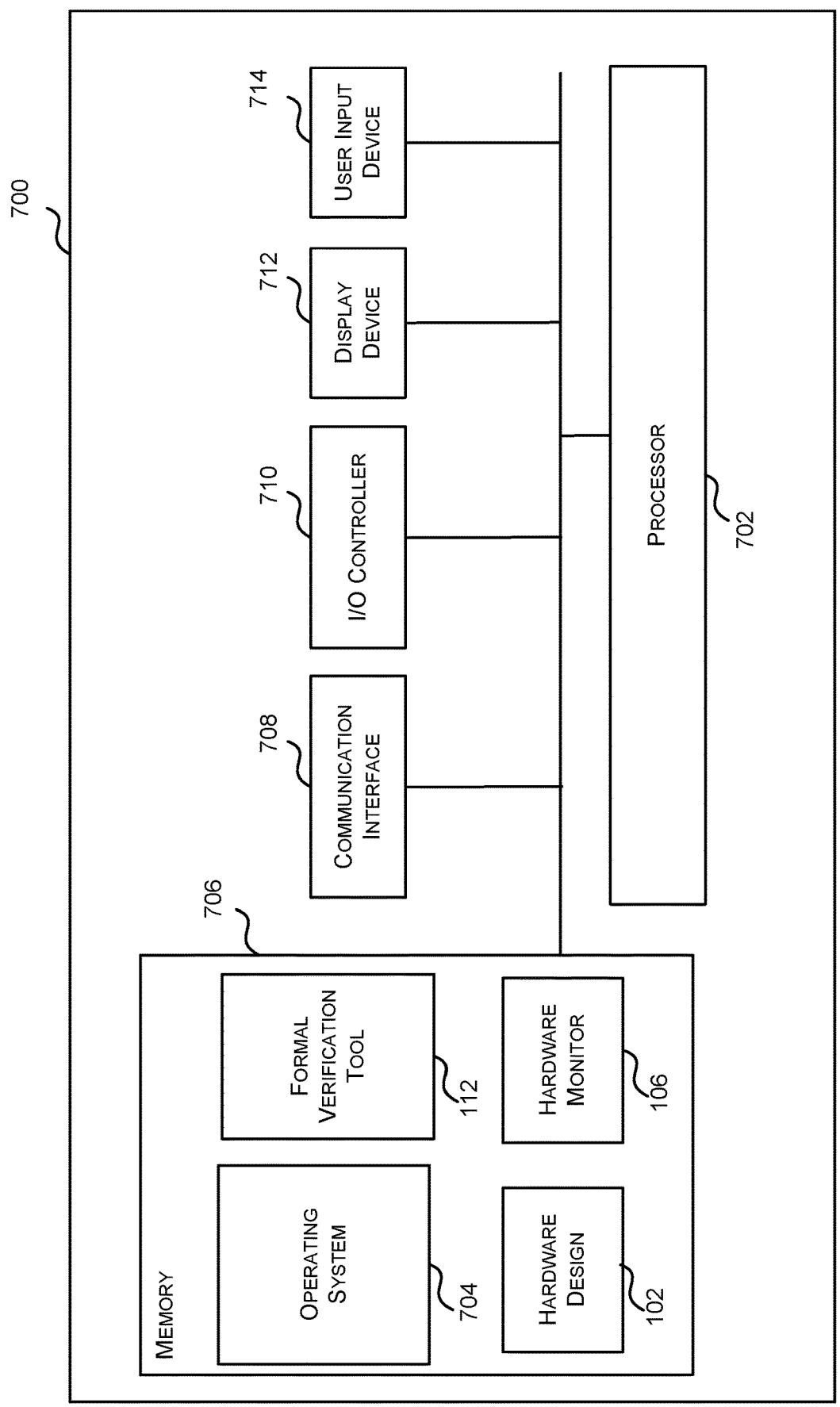
FIG. 7 is a block diagram of an example general purpose computing-based device.

FIG. 7 illustrates various components of an exemplary general purpose computing-based device 700 which may be implemented as any form of a computing and/or electronic device, and in which embodiments of the systems, methods and hardware monitors described above may be implemented.

General purpose computing-based device 700 comprises one or more processors 702 which may be microprocessors, controllers or any other suitable type of processors for processing computer executable instructions to control the operation of the device in order to determine if a firmware binary image 105 comprises an illegal firmware instruction. In some examples, for example where a system on a chip architecture is used, the processors 702 may include one or more fixed function blocks (also referred to as accelerators) which implement a part of the method of detecting illegal firmware instructions in a firmware binary image 105 in hardware (rather than software or firmware). Platform software comprising an operating system 704 or any other suitable platform software may be provided at the computing-based device to enable application software, such as a formal verification tool 112, to be executed on the device.

The computer executable instructions may be provided using any computer-readable media that is accessible by the general purpose computing based device 700. Computer-readable media may include, for example, computer storage media such as memory 706 and communications media. Computer storage media (i.e. non-transitory machine readable media), such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 706) is shown within the general purpose computing-based device 700 it will be appreciated that the storage may be distributed or located remotely and accessed via a network or other communication link (e.g. using communication interface 708).

The general purpose computing-based device 700 also comprises an input/output controller 710 arranged to output display information to a display device 712 which may be separate from or integral to the general purpose computing-based device 700. The display information may provide a graphical user interface. The input/output controller 710 is also arranged to receive and process input from one or more devices, such as a user input device 714 (e.g. a mouse or a keyboard). This user input may be used to, for example, initiate formal verification of the assertions defined in the hardware monitor 106. In an embodiment the display device 712 may also act as the user input device 714 if it is a touch sensitive display device. The input/output controller 710 may also output data to devices other than the display device, e.g. a locally connected printing device (not shown in FIG. 7).

The hardware monitors of FIGS. 1, 3, and 5 are shown as comprising a number of functional blocks. This is schematic only and is not intended to define a strict division between different logic elements of such entities. Each functional block may be provided in any suitable manner. It is to be understood that intermediate values described herein as being formed by a hardware monitor need not be physically generated by the hardware monitor at any point and may merely represent logical values which conveniently describe the processing performed by the hardware monitor between its input and output.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

As described above a hardware design, which also may be referred to herein as an integrated circuit definition data set, describes the structure and functionality of an integrated circuit. The hardware design may be implemented in software, such as HDL (hardware description language). Accordingly, there may be provided a computer readable storage medium having encoded thereon computer readable program code in the form of an integrated circuit definition dataset (e.g. hardware design) that when processed in an integrated circuit manufacturing system configures the system to manufacture an integrated circuit forming an electronic device according to the hardware design.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (R™) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an electronic device will now be described with respect to FIG. 8.

Figure 8:
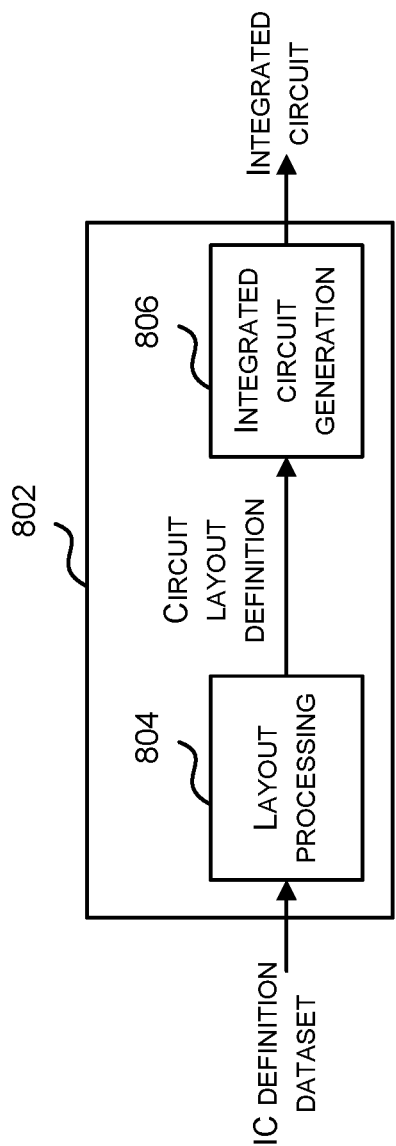
FIG. 8 is a block diagram of an example integrated circuit manufacturing system.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. a hardware design 102), process the IC definition dataset, and generate an IC according to the IC definition dataset (e.g. hardware design 102). The processing of the hardware designs 102 described herein configures the IC manufacturing system 802 to manufacture an integrated circuit forming an electronic device.

The layout processing system 804 is configured to receive and process the IC definition dataset (e.g. hardware design 102) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A hardware monitor arranged to detect illegal firmware instructions in a firmware binary image based on a hardware design for an electronic device configured to execute the firmware binary image, detect illegal firmware instructions in the firmware binary image, and stop execution of the firmware binary image upon detection of an illegal firmware instruction, the hardware monitor comprising:
   monitor and detection logic configured to:
      detect that an instantiation of the hardware design has stopped execution of the firmware binary image; and
      detect that the instantiation of the hardware design implements a decode of an illegal firmware instruction; and
   assertion evaluation logic configured to determine whether the firmware binary image comprises an illegal firmware instruction by evaluating one or more formal assertions that assert a formal property that states that if a stop of firmware binary image execution has been detected, that decode of an illegal firmware instruction has, or has not, been detected.

2. The hardware monitor of claim 1, wherein the monitor and detection logic comprises one or more decode illegal instruction registers and decode illegal instruction detection logic configured to detect that the instantiation of the hardware design has decoded an illegal firmware instruction based on one or more control and/or data signals of the hardware design, and in response to detecting that the instantiation of the hardware design has decoded an illegal firmware instruction, set at least one of the one or more decode illegal instruction registers.

3. The hardware monitor of claim 2, wherein the one or more decode illegal instruction registers comprise one decode illegal instruction register corresponding to each of a plurality of illegal firmware instructions, and the decode illegal instruction detection logic is configured to, in response to detecting that the instantiation of the hardware design has decoded one of the plurality of illegal firmware instructions, setting the corresponding decode illegal instruction register.

4. The hardware monitor of claim 2, wherein the decode illegal instruction detection logic is configured to detect that the instantiation of the hardware design has decoded an illegal firmware instruction by comparing an opcode of a decoded instruction to an opcode of the illegal firmware instruction.

5. The hardware monitor of claim 1, wherein the monitor and detection logic comprises one or more firmware execution registers and firmware execution detection logic configured to detect that the instantiation of the hardware design has stopped execution of the firmware binary image based on one or more control and/or data signals of the hardware design, and in response to detecting that the instantiation of the hardware design has stopped execution of the firmware binary image to set one or more of the one or more firmware execution registers.

6. The hardware monitor of claim 5, wherein the firmware execution detection logic is configured to detect that the instantiation of the hardware design has stopped execution of the firmware binary image when the instantiation of the hardware design is in a particular state.

7. The hardware monitor of claim 6, wherein the particular state is an IDLE state.

8. The hardware monitor of claim 1, wherein the one or more formal assertions comprises at least one seen assertion that asserts a formal property that states that if a stop of firmware binary image execution has been detected that decode of an illegal firmware instruction has been detected, and at least one not seen assertion that asserts a formal property that states that if a stop of firmware binary image execution has been detected that decode of an illegal firmware instruction has not been detected.

9. The hardware monitor of claim 1, wherein the assertion evaluation logic is further configured to determine whether the instantiation of the hardware design responds as expected to an illegal firmware instruction in the firmware binary image by evaluating one or more recovery assertions that state that if decode of an illegal firmware instruction has been detected that the instantiation of the hardware design goes into a particular state.

10. The hardware monitor of claim 1, wherein the assertion evaluation logic is further configured to determine whether the instantiation of the hardware design responds as expected to an illegal firmware instruction in the firmware binary image by evaluating one or more mutually exclusive assertions that state that if decode of a particular illegal firmware instruction of a plurality of illegal firmware instructions has been detected that decode of any other of the plurality of illegal firmware instructions is not detected.

11. The hardware monitor of claim 1, wherein the assertion evaluation logic is configured to, in response to determining that at least one of the one formal assertion or more formal assertions is evaluated to be false, output a signal indicating that the at least one formal assertion was evaluated to be false.

12. The hardware monitor of claim 1, wherein when the hardware design is processed in an integrated circuit manufacturing system, the hardware design configures the integrated circuit manufacturing system to manufacture the electronic device.

13. The hardware monitor of claim 1, wherein the hardware monitor is embodied in an integrated circuit definition dataset, which when processed in an integrated circuit manufacturing system, configures the integrated circuit manufacturing system to manufacture the hardware monitor.

14. The hardware monitor of claim 1, wherein the hardware monitor is embodied in hardware on an integrated circuit.

* * * * *